US008170058B2

(12) United States Patent
Tanaka et al.

(10) Patent No.: US 8,170,058 B2
(45) Date of Patent: May 1, 2012

(54) COMMUNICATIONS DEVICE, COMMUNICATIONS METHOD, AND STORAGE MEDIUM

(75) Inventors: Kota Tanaka, Kyoto (JP); Kohji Sakai, Kashiba (JP); Fumihiro Fukae, Sakurai (JP); Hitoshi Naoe, Nara (JP); Atsuhiro Doi, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 141 days.

(21) Appl. No.: 12/349,985

(22) Filed: Jan. 7, 2009

(65) Prior Publication Data
US 2009/0180394 A1 Jul. 16, 2009

(30) Foreign Application Priority Data

Jan. 11, 2008 (JP) ................................ 2008-005022

(51) Int. Cl.
*H04J 3/16* (2006.01)
(52) U.S. Cl. ......... 370/469; 370/401; 370/412; 370/467
(58) Field of Classification Search .................. 370/310, 370/315, 328, 400, 401, 412, 420, 432, 447, 370/464–469
See application file for complete search history.

(56) References Cited

U.S. PATENT DOCUMENTS

| 5,065,035 | A | * | 11/1991 | Juengel ........................ 250/551 |
| 5,266,782 | A | * | 11/1993 | Alanara et al. ................ 235/380 |
| 5,408,646 | A | * | 4/1995 | Olnowich et al. .............. 714/4.1 |
| 5,454,033 | A | * | 9/1995 | Hahn et al. .................... 379/198 |
| 6,882,659 | B1 | * | 4/2005 | Novak et al. .................. 370/466 |
| 7,014,374 | B2 | * | 3/2006 | Hamaguchi et al. ............ 400/62 |
| 7,031,661 | B2 | * | 4/2006 | Berkema et al. ............. 455/41.3 |
| 7,787,391 | B2 | * | 8/2010 | Sakai et al. ................... 370/252 |
| 8,036,244 | B2 | * | 10/2011 | Naoe et al. .................... 370/469 |
| 2003/0081557 | A1 | * | 5/2003 | Mettala et al. ................ 370/252 |
| 2005/0052679 | A1 | * | 3/2005 | Green et al. ................. 358/1.14 |
| 2005/0271022 | A1 | | 12/2005 | Osawa et al. |

FOREIGN PATENT DOCUMENTS

| JP | 9-224069 A | 8/1997 |
| JP | 2005-347836 A | 12/2005 |
| JP | 2007-151195 A | 6/2007 |

OTHER PUBLICATIONS

Naoe et al., Sharp Technical Report, vol. 95, Feb. 2007, p. 63-68.

* cited by examiner

*Primary Examiner* — Robert Scheibel
*Assistant Examiner* — Mark A Mais
(74) *Attorney, Agent, or Firm* — Birch, Stewart, Kolasch & Birch, LLP

(57) ABSTRACT

A communications device is provided which receives data frames in FIR communications mode even if the device has failed to normally receive a connect frame in SIR communications mode.
A communications device according to the invention includes an incoming frame processing section for receiving an SNRM frame and UI frames in different frame formats. The SNRM frame contains a setting for a connection for data communications. The UI frames contain data. The communications device also includes a reception processing section and connect command notification sections. The reception processing section renders a light reception section stand by for reception of the UI frames in FIR communications mode. The connect command notification sections generate a connect command for output to an upper layer. The connect command enables establishing of the same connection when a data frame is received from another communications device as when a connect frame was received from the other communications device.

52 Claims, 15 Drawing Sheets

FIG. 14

| ADR | SNRM | Source Address | Destination Address | Connection Address | Connection Parameters |

US 8,170,058 B2

COMMUNICATIONS DEVICE, COMMUNICATIONS METHOD, AND STORAGE MEDIUM

This nonprovisional application claims priority under 35 U.S.C. §119(a) on Patent Application No. 2008-005022 filed in Japan on Jan. 11, 2008, the entire contents of which are hereby incorporated by reference.

FIELD OF THE INVENTION

The present invention relates to devices, systems, methods, and storage mediums for communications which involve two different frame formats.

BACKGROUND OF THE INVENTION

With the rising popularity of digital cameras and mobile phones equipped with cameras in recent years, private photographs have come to be handled in the form of image data more frequently. Also, the image data is often imported from a digital camera or a mobile phone equipped with a camera either for display on a television or other display device or to print on a printer or other image forming device. Accordingly, cable-free, wireless communications technology is now in popular use for transmission of relatively large data, such as video and audio, between information devices over a PAN (Personal Area Network) which provides a coverage of a few meters.

The conventional communications standards used in the communications field mentioned above are built on the OSI (Open System Interconnection) model shown in FIG. 12 to ensure data communications between different types of devices. An example is the IrDA® (Infrared Data Association) standard. The conventional communications standards are basically for bidirectional communications in which an operation is repeated to check that both devices are ready to communicate with each other by searching for a device with which to communicate, identifying it, and negotiating with it.

Different specifications are established for each layer in the communications standards based on the OSI model. Specifically, the OSI model is designed to include: a data link layer managing a protocol for communications with another device; a network layer managing a data link by means of services given by the data link layer; a transport layer managing flows of data frames by means of frame numbers to detect missing frames; and a session layer. The layers of the communications device exchange information, including a connect request, a connect command, and a connect acknowledge, to establish/discontinue a connection as well as to transfer data.

Meanwhile, in the use described above, the user often directs by himself the light emission section of a transmitting-end device at the light reception section of a receiving-end device to transmit data. Therefore, the bidirectional process of searching for a device with which to communicate and ascertaining each other is not always necessarily.

Japanese Unexamined Patent Publication No. 2005-347836 (Tokukai 2005-347836; published Dec. 15, 2005) discloses a communications system in which management information based on which data to be transmitted is managed is transmitted, communications capability information indicative of the communications capability of a device which has responded to the transmission of the management information is received from that device, and data to be transmitted is transmitted in packets according to the received communications capability information, so as to omit the process of searching a device which is capable of receiving data in infrared communications.

There is also a communications standard called IrSimplee which realizes high speed data communications when the process of searching for a device which is capable of reception is not absolutely needed in infrared communications. See "Standardization of High Speed Infrared Communications Protocol IrSimple," by NAOE Hitoshi and six other authors, Sharp Technical Report, Issue 95, February 2007, pp. 63-68.

Referring to FIG. 13, in conventional infrared communications, a connect frame (communications information notification frame) in SIR (Serial Infrared) communications mode is transmitted at low speed (about 9,600 bps) prior to the transmission of data frames in FIR (Fast Infrared) communications mode at high speed (than 4 Mbps or faster). Generally, a data frame is transferred more than once when image data or like large data is transferred. When the transfer of data frames is finished, a DISC (Disconnect) frame, which is a disconnect command in FIR communications mode, is transferred to discontinue the communications connection.

A "frame" in this context refers to a frame used generally in the communications field. It is a piece of information having its start and end being defined.

A "connect frame" is a set of information needed to enable communications between a communications device on a transmitting-end and a communications device on a receiving-end.

A "data frame" is a set of information containing image data or a similar content which is to be transferred between a communications device on a transmitting-end and a communications device on a receiving-end.

A "frame format" defines a frame structure, specifying which bit represents what in the sequence of bits in a frame.

An SNRM frame (connect frame for IrDA, IrSimple, etc.), taken as an example, has a frame format shown in FIG. 14. The ADR segment gives a broadcast address. The SNRM segment gives data representing a frame type, indicating that this frame is an SNRM frame.

The Source Address segment gives data indicative of the address of a primary station (communications device on a transmitting-end). The Destination Address segment gives data indicative of the address of a secondary station (communications device on a receiving-end). The Connection Address segment gives data indicative of an address used in communications with a station on another end. The connection parameter segment contains data indicative of transmission conditions for the succeeding data frame.

In contrast, a UI frame (IrSimple data frame) has a frame format shown in FIG. 15. The ADR segment contains a Connection Address given by an SNRM frame which is an address used in communications with a station on another end.

The UI segment gives data representing a frame type, indicating that this frame is a UI frame. The transmission data segment a set of data containing image data or a similar content which is to be transferred. The frame format does not vary depending on communications speed and modulation schemes.

Conventional infrared communications are prone to infrared noise emitted by, for example, an inverter-type fluorescence lamp, a liquid crystal television containing a cold cathode tube, and a plasma television. The receiving-end device may not be able to receive a low-speed connect frame correctly, and as a result, fail to properly receive data frames which follow the connect frame.

In the case of a liquid crystal television with a cold cathode tube or a like communications device emitting infrared noise, the emitted infrared noise is reflected by objects located nearby and obstructs infrared communications. The infrared noise reflected by the body of the user is especially disruptive in infrared communications because the user operates the transmitting-end terminal while holding it in his hand as close as about 20 cm to 1 meter to the infrared reception section of the receiving-end communications device. It is also known that infrared noise increases if the temperature of the cold cathode tube is as low as 0° C. to 10° C. or even lower. It is also recognized that in some cases it takes about 10 minutes for the cold cathode tube to warm up enough to reduce effect of infrared noise after the television is powered on in such a low temperature environment.

The origin of the trouble caused by infrared noise in data reception in conventional infrared communications can be traced back to the fact that a UI frame (data frame) is transmitted in FIR communications mode after an SNRM frame (connect frame) is transmitted in SIR communications mode.

Specifically, data bits 0 and 1 are represented by the presence/absence of a pulse in a predetermined period in the RZI (Return to Zero Inversion) modulation employed in SIR communications mode. For example, the IrSS ("IrSimpleShot®"; a one-way communications standard under the IrSimple), in SIR communications mode in which a connect frame is transmitted at a communications speed of about 9,600 bps, specifies an insertion of a 1.41 μs to 22.13 μs pulse in an about 104 μs period to represent a data bit 0 and no insertion of a pulse in the about 104 μs period to represent a data bit 1.

Hence, the connect frame is masked by noise signals if, for example, an inverter-type fluorescence lamp exists near the communications device and producing lot of infrared noise pulses with a duration of about a few microseconds to a few tens of microseconds. The noise pulses are erroneously recognized as data bit pulses, the connect frame cannot be correctly received. As a result, the communications device on the receiving-end cannot switch to data frame reception in FIR communications mode, failing to receive data frames transmitted in FIR communications mode.

The problems could be addressed by sending a connect frame in a noise-resistant FIR communications mode or introducing an error correction code, e.g. Reed-Solomon error recovery code, to improve noise resistance without altering modulation schemes. it is, however, not easy to alter the signal formats of the connect frame, which is transmitted before any other frame, due to the need to provide compatibility with conventional standards.

The description above has dealt with issues in the transmission/reception of a connect frame and data frames by infrared. The same issues are found with a communications device which, prior to the transmission of data frames, transmits a connect frame containing data frame transmission conditions in a different signal format from the one in which the data frames are transmitted.

SUMMARY OF THE INVENTION

The present invention, conceived in view of these conventional problems, has an objective of providing a communications device, a communications method, and a storage medium capable of communications involving different frame formats for the transmission of a connect frame and for the transmission of data frames where the data frames can be received without having to receive the connect frame.

The communications device according to the present invention is, to address the problems, characterized in that the device includes: an incoming frame processing section for receiving a connect frame and data frames in different frame formats from another communications device for output to an upper layer, the connect frame containing a setting for a connection for data communications, the data frames containing data; and a connect command generation section for, at least either if the incoming frame processing section has received a data frame before receiving the connect frame or if the incoming frame processing section has received a connect request from the upper layer, generating a connect command for output to the upper layer.

The communications method according to the present invention is characterized in that the method is implemented by a communications device including an incoming frame processing section for receiving a connect frame and data frames in different frame formats from another communications device, the connect frame containing a setting for a connection for data communications, the data frames containing data, and also that the method includes the step of, at least either if the incoming frame processing section has received a data frame before receiving the connect frame or if the incoming frame processing section has received a connect request from the upper layer, generating a connect command for output to the upper layer.

According to the arrangement, when the connect frame and the data frames are transmitted in different communications modes, specifically, at two or more different communications speeds, modulation schemes, or various other communications conditions, the data frames can be received in a second communications mode even if the connect frame cannot be normally received in a first communications mode. Therefore, the arrangement increases the probability of successfully receiving subsequent data frames.

Additional objectives, advantages and novel features of the invention will be set forth in part in the description which follows, and in part will become apparent to those skilled in the art upon examination of the following or may be learned by practice of the invention.

BRIEF DESCRIPTION OF THE DRAWINGS

FIG. 14 is a drawing depicting the format of an SNRM frame.

REFERENCE NUMERALS

Figure 1:
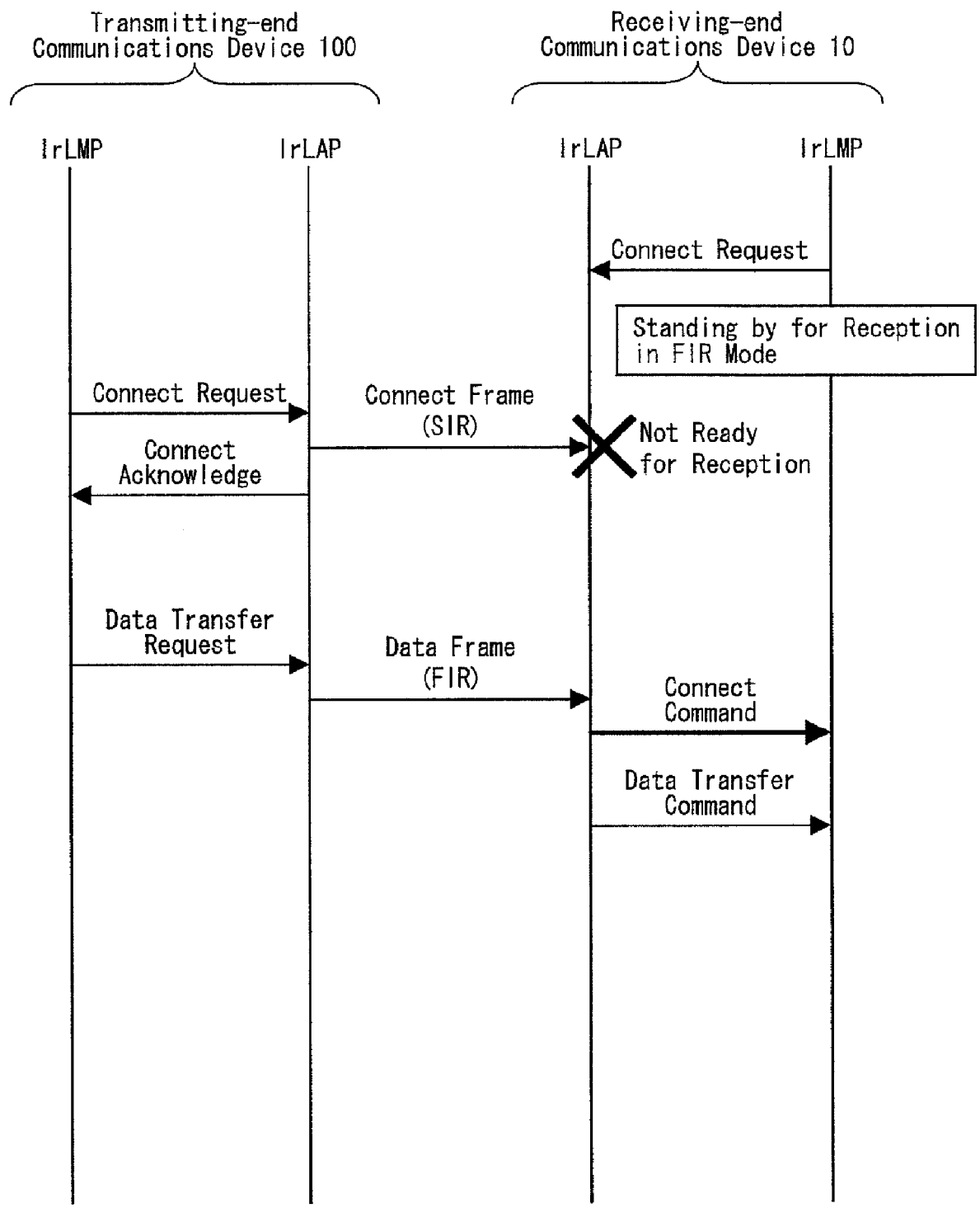
FIG. 1, illustrating an embodiment of the present invention, is a schematic drawing of a communications sequence for a communications device.

10 Receiving-end Communications Device (Communications Device)
20 Reception Processing Section (Connect Command Generation Section)
22 Light Reception Section
24 Reception Control Section
26 Input I/F Section
28 Data Writing Section
30 Communications I/F Section
32 SIR Demodulation Section
34 FIR Demodulation Section
36 Demodulation Section Selector
40 Incoming Frame Processing Section
42 Frame Analysis Section
44 Connect Frame Analysis Section
46 Data Frame Analysis Section
48 Disconnect Frame Analysis Section
50 IrSimple-IrLAP Layer Processing Section
51 Connect Request Reception Section
52 Disconnect Request Reception Section
53, 54 Connect Command Notification Section (Connect Command Generation Section)
55 Data Transfer Command Notification Section
56 Disconnect Command Notification Section
58 Flag Counter
60 Upper Layer Processing Section
61 Connect Request Reception Section
62 Connect Request Notification Section
63 Disconnect Request Reception Section
64 Disconnect Request Notification Section (Disconnect Command Generation Section)
65, 67 Connect Command Notification Section
66 Connect Command Reception Section
68 Connect Command Analysis Section
69 Data Transfer Command Notification Section
70 Data Transfer Command Analysis Section (Frame Monitoring Section)
71 Disconnect Command Notification Section
72 Disconnect Command Analysis Section
74 Error Detection Section
76 Serial Number Analysis Section
80 Application Layer Processing Section
82 Timer
84 Elapsed Time Analysis Section (Elapsed Time Measuring Section)
90 Memory Section
92 Display Section
100 Transmitting-end Communications Device (Communications Device)
110 Receiving-end Communications Device

DESCRIPTION OF THE EMBODIMENTS

Overview

The embodiments given later will describe, as an example, a transmission of image data stored in a mobile phone with a camera to a liquid crystal television by infrared communications based on the IrSS (IrSimpleShot®). Therefore, the physical layer is sometimes interpreted as the IrPHY, the data link layer (LAP layer) as the IrSimple-IrLAP, the network layer (LMP layer) as the IrSimple-IrLMP, and the transport layer as the IrSMP. This is by no means intended to be limiting the invention.

The embodiments will also describe, as an example, a reception of JPEG data (image data) frames as data frames received by a receiving-end communications device 10. This is again by no means intended to be limiting the invention. The data frames received by the receiving-end communications device 10 may contain an image of a different format, text, audio, movie, or any other content.

The embodiments will describe, in detail based on the OSI 7 layer model, the structure and operation of a transmitter and a receiver which make up the communications system in accordance with the present invention. The OSI 7 layer model in this context is also known as the OSI basic model and the OSI hierarchy model. The OSI 7 layer model divides the communications functionality which a computer should possess into seven layers and defines a standard functional module for each layer, to realize data communications between different types of devices.

Figure 12:
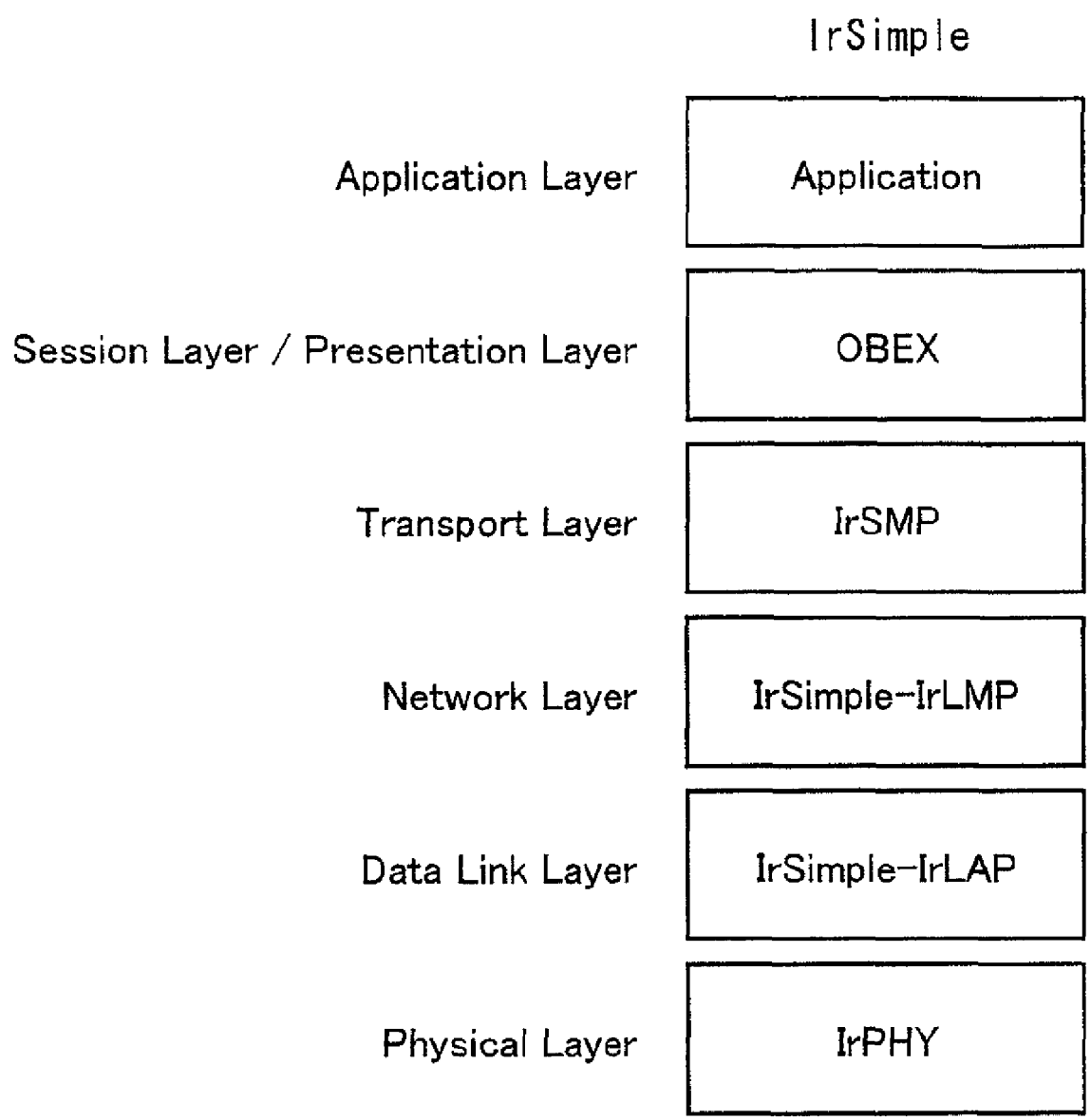
FIG. 12 is a conceptual drawing of the layer structure of the OSI 7 hierarchy model under the IrSimple standards.

FIG. 12 is a drawing showing how the communications layers implemented on the conventional IrSS-based communications device correspond to the OSI model layers. The first layer (physical layer) performs electrical conversion and mechanical operation for sending out data to a communications line. The second layer (data link layer) primarily secures a physical channel and detects errors in data flow on the channel. The third layer (network layer) primarily selects a communications path and manages addresses in the communications path. The fourth layer (transport layer) primarily performs data compression, error correction, and retransmission control. The fifth layer (session layer) primarily establishes and releases a virtual path (connection) through which communications programs transmit/receive data with each other. The sixth layer (presentation layer) primarily converts the data received from the fifth layer to a form easily understandable by the user and converts the data coming from the seventh layer to a format suitable for communications. The seventh layer (application layer) provides various services involving data communications to humans and computer programs.

The communications layers for the communications systems of the embodiments have equivalent functions as analogous layers in the OSI 7 layer model. The embodiments use a six layer hierarchy by integrating the session layer and the presentation layer into a single layer. Description of the application layer is omitted in the embodiments.

The present invention is applicable to a wide range of communications systems in which communications are carried out by the transmitter and the receiver establishing a connection between more than one communications layer. In other words, the division of the communications functionality may not follow the OSI 7 layer model. The number of communications layers is arbitrary so long as the design involves a plurality of communications layers for which a connection should be established.

Figure 13:
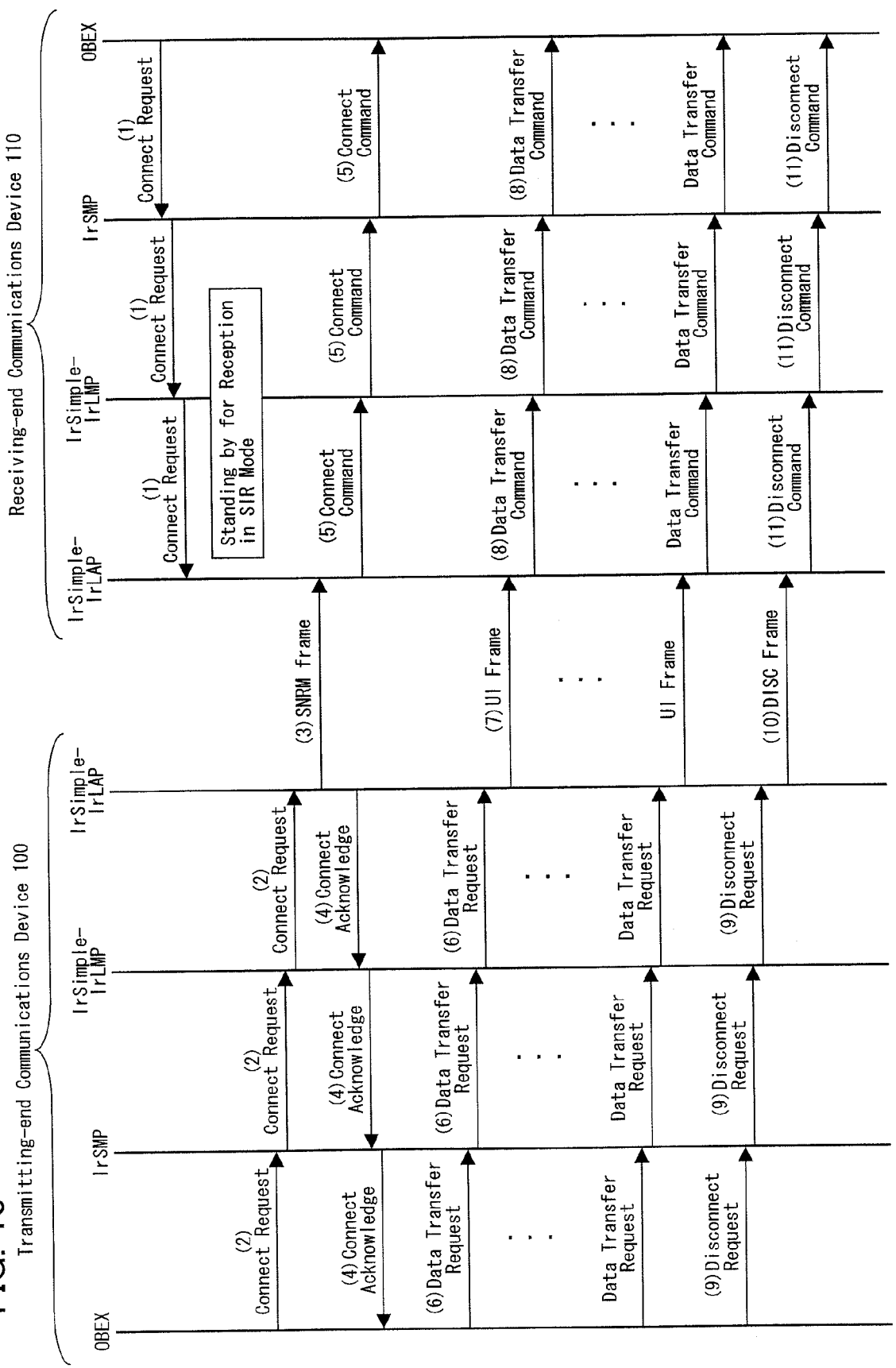
FIG. 13, illustrating a conventional example, is a sequence drawing for an operation in IrSS-compliant one-way infrared communications.
Figure 15:
FIG. 15 is a drawing depicting the format of a UI frame.

The IrSimple-based conventional communications method and the communications method of the present embodiment will be first described in reference to FIGS. 1 and 13. FIG. 1 is a schematic of a communications method implemented by the receiving-end communications device 10 according to the present embodiment. FIG. 13 is a schematic of a communications sequence for IrSS-based one-way infrared communications implemented by a conventional communications device.

FIG. 13 shows a communications device 100 on a transmitting-end (transmitting-end communications device) in an attempt to transmit data to a communications device 110 on a receiving-end (receiving-end communications device). The transmitting-end and receiving-end communications devices 100 and 110 each include an OBEX, an IrSMP, an IrSimple-IrLMP, and an IrSimple-IrLAP layer and move communications requests and data from an upper layer to a lower layer and from a lower layer to an upper layer to perform communications.

The following description, assuming compliance to the IrSS standards, employs a SIR (Serial Infrared) communications mode, which is a low speed communications scheme at about 9,600 bps, as a first communications mode and a FIR (Fast Infrared) communications mode, which is a high speed communications scheme at 4 Mbps or beyond, as a second communications mode. This is by no means intended to be limiting the invention. A VFIR (Very Fast Infrared) communications mode, which is a high speed communications scheme at 16 Mbps, may be employed as a modulation scheme in place of the FIR communications mode.

The process starts in the receiving-end communications device 110 in which a connect command is sent downward from an upper layer, causing the IrSimple-IrLAP layer and the lower physical layers (not shown) in the receiving-end communications device 110 to stand by for communications in SIR communications mode. (2) Next, in the transmitting-end communications device 100, a connect request is sent downward from an upper layer. (3) An SNRM (Set Normal Response Mode) frame (connect frame) is transmitted from the transmitting-end communications device 100 to the receiving-end communications device 110 through an infrared communications path.

(4) Next, as a consequence of the transmission of the SNRM frame from the transmitting-end communications device 100 to the receiving-end communications device 110 in (3) above, a connect acknowledge is sent to the upper layer from the IrSimple-IrLAP layer, which is a lower layer having transmitted the SNRM frame. (5) At the same time, in the receiving-end communications device 110, the IrSimple-IrLAP layer (lower layer) receives the SNRM frame (3) from the physical layer (lower layer) and sends a connect command to an upper layer. The connect command (5) switches the receiving-end communications device 110 into a data reception standby state.

(6) Meanwhile, in the transmitting-end communications device 100, an upper layer sends a data transfer request, and (7) the transmission data that should actually be transmitted to the receiving-end communications device 110 is transmitted as UI frames. (8) In the receiving-end communications device 110, data divided into a plurality of frames is received as UI frames from the IrSimple-IrLAP layer (and physical layer) which have been in the data reception standby state and sent to upper layers. The procedure (8) is repeated as many times as the number of the incoming data frames to receive the entire data.

Thereafter, as the data is transmitted, a disconnect request to discontinue the communications connect state is (9) sent from an upper layer of the transmitting-end communications device 100 and (10) transmitted as a DISC frame to the receiving-end communications device 110. (11) In the receiving-end communications device 110, the disconnect command is received and sent to an upper layer, to release the communications layers from the communications standby state.

Next will be described potential problems in the communications sequence and their solutions provided by the present invention.

In the communications sequence shown in FIG. 13, an SNRM frame as the connect frame (3), UI frames as the data frames (7), and a DISC frame as the disconnect command frame (10) are sent by infrared communications from the transmitting-end communications device 100 to the receiving-end communications device 110 via a physical layer (not shown) and infrared light emitting and receiving elements to perform communications. In the communications, a connect frame for SIR, low speed communications mode is transmitted prior to data frames for FIR, high speed communications mode.

The connect frame transmitted in SIR communications mode may not be correctly received. For example, the connect frame can be masked by noise signals depending on environmental conditions and recognized as pulses representing data bits. As a result, the receiving-end communications device 110 cannot switch to data frame reception in FIR communications mode, failing to receive data frames transmitted in FIR communications mode.

To address these problems, the receiving-end communications device 10 according to the present invention is standing by in advance for reception in FIR communications mode as illustrated in FIG. 1. The device 10 of course is not able to receive any connect frames transmitted in SIR communications mode due to difference in communications speed, modulation scheme, and other communications conditions.

The receiving-end communications device 10 includes a connect command generation section for, upon receiving a connect frame in SIR communications mode while standing by for reception in FIR communications mode, generating a similar connect command to the one generated when a connect frame transmitted in SIR communications mode is received.

Therefore, even if the connect command generation section fails to receive the connect frame transmitted in SIR communications mode, the connect command generation section can send, to upper layers, a connect command similar to the one generated when the connect frame is received. The receiving-end communications device 10 is thus capable of continuing data communications in FIR communications mode while maintaining compatibility with the conventional communications scheme. The following will describe specific communications sequence by way of embodiments.

Embodiment 1

Figure 2:
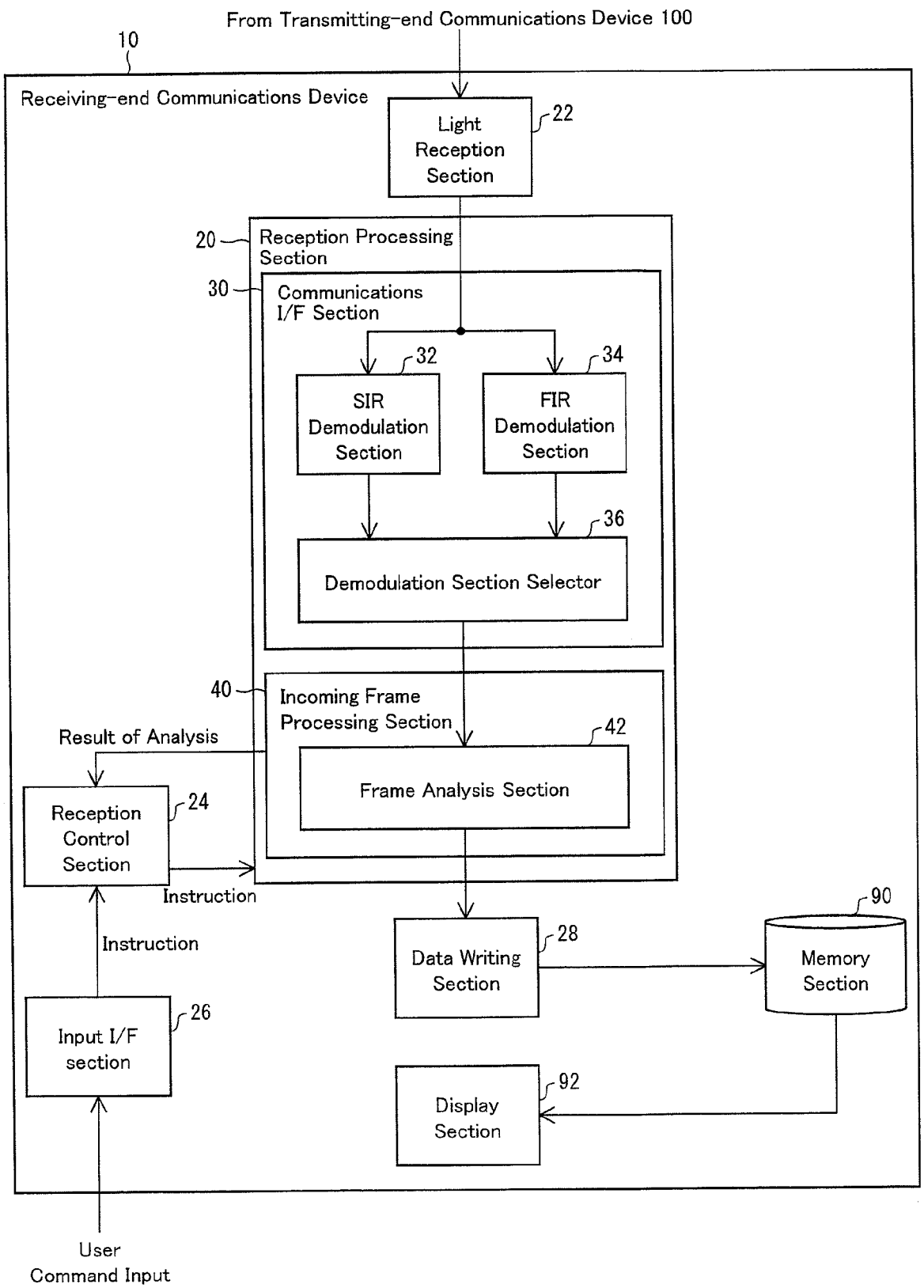
FIG. 2 is a functional block diagram of the basic configuration of the communications device.

An embodiment of the present invention will be described in reference to FIGS. 2 to 5. FIG. 2 is a schematic functional block diagram of the configuration of the receiving-end communications device 10 of the present embodiment. The members provide a mere embodiment of the present invention and are by no means limited to those mentioned here. Also, the members may be implemented by either hardware or software.

The receiving-end communications device 10 is a terminal for data reception by infrared communications and will be described as a mobile communications terminal, such as a mobile phone, in the following. The receiving-end communications device 10 includes a reception processing section (connect command generation section) 20, a light reception section 22, a reception control section 24, an input I/F section 26, a data writing section 28, a memory section 90, and a display section 92.

The reception processing section 20 is a processing section for controlling frame reception in response to a receive command from the reception control section 24. The section 20 includes a communications I/F section 30 and an incoming frame processing section 40.

The light reception section 22 is a light reception module composed of a light reception element and other devices for infrared communications. The section 22 includes a data reception photo diode. The light reception section 22 receives a frame by sensing On/Off of the infrared LED with the photo diode.

The reception control section 24 demodulates received frames by a predetermined demodulation scheme and process the frames based on a predetermined frame format in accordance with the content of a user request received via the input I/F section 26. The reception control section 24 also generates a command signal for switching between communications modes in accordance with data frame transmission conditions contained the connect frame received from the incoming frame processing section 40 and supplies the signal to, for example, the light reception section 22 and the communications I/F section 30.

The input I/F section 26 is an input device accepting user command inputs and built around a keyboard, switches, and a touch panel, to name a few examples. Specific examples of the user commands include a command with which to instruct for a reception of JPEG data.

The data writing section 28 receives the frame data analyzed by a frame analysis section 42 in the incoming frame processing section 40 and for storage in the memory section 90.

The communications I/F section 30 is a processing section for demodulating the frames received from the light reception section 22 and includes a SIR demodulation section 32, a FIR demodulation section 34, and a demodulation section selector 36.

The SIR demodulation section 32 demodulates data transmitted in SIR communications mode (first communications mode) and outputs demodulated data to the demodulation section selector 36. The FIR demodulation section 34 demodulates data transmitted in FIR communications mode (second communications mode) and outputs demodulated data to the demodulation section selector 36.

The signal format used in SIR communications mode is in accordance with RZI modulation whereby a 0 and 1 is represented by presence/absence of a 1.41 μs to 22.13 μs infrared pulse in a period of about 104 μs. A 0 is represented by presence of such a pulse. A 1 is represented by absence of the pulse. In the signal format used in SIR communications mode, the duty falls to about 2% if a 1 continuously occurs where there appears no pulse. The automatic gain controller provided in the communications device increases gain, causing the device to pick up noise. The device could therefore be easily affected by infrared noise. That is likely to lead to communications errors.

The signal format used in FIR communications mode, on the other hand, is 4 PPM modulation whereby 2-bit data is represented by the position of an about 125-nanosecond infrared pulse in a period of about 500 nanoseconds. In the modulation scheme, an infrared pulse appears at regular intervals, specifically, about once every 500 nanoseconds; the duty reaches a fixed value of 25%. The automatic gain controller provided in the communications device is capable of clearly distinguish between signal and noise. Therefore, the device is less prone to infrared noise and therefore less likely to develop communications errors from infrared noise, in FIR communications mode than in SIR communications mode.

The demodulation section selector 36, according to an instruction from the reception control section 24, switches the output to the incoming frame processing section 40 between the output from the SIR demodulation section 32 and the output from the FIR demodulation section 34.

The incoming frame processing section 40 includes functional sections for the processing of the frames which are received and demodulated. Specifically, the section 40 includes a frame analysis section 42 whose functional sections will be detailed later.

The frame analysis section 42 analyzes the received data output of the demodulation section selector 36 to determine whether the received data is either a connect frame or a data frame. If the received data is a connect frame, the frame analysis section 42 outputs the received data to a connect frame processing section. If the received data is a data frame, the section 42 outputs the received data to a data frame processing section. If the received data is a disconnect frame, the section 42 outputs the received data to a disconnect frame processing section.

The data writing section 28 receives the frame data analyzed by the frame analysis section 42 for storage in the memory section 90.

The memory section 90 is a memory means storing image data received in JPEG format, various information used in the receiving-end communications device 10, an OS (operating system), and control programs. The memory section 90 stores connection parameters which are conditions for the transmission of data frames. The conditions are read out from the section 90 to a connect command notification section 54 when necessary. The connection parameters are preferably those specified in the IrDA and IrSimple standards.

The display section 92 is an output device for display of the image data received by data frame transmission. The display section 92 may be built around a touch panel or a display device.

Figure 3:
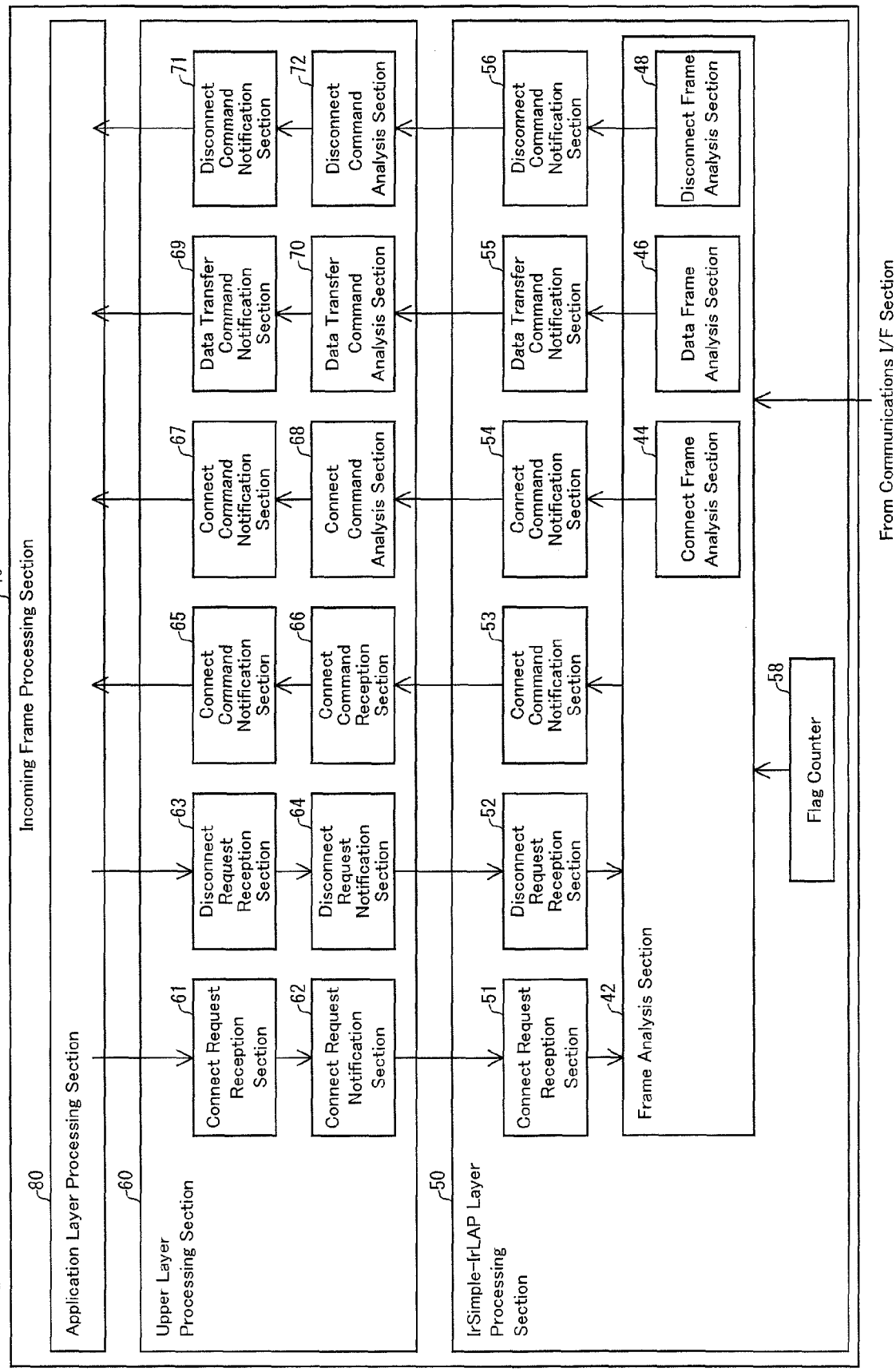
FIG. 3 is a functional block diagram of an incoming frame processing section in the communications device in further detail.

Next will be described in detailed the incoming frame processing section 40 in the receiving-end communications device 10 in reference to FIG. 3. FIG. 3 is a functional block diagram of the incoming frame processing section 40 showing more details.

The incoming frame processing section 40 includes an IrSimple-IrLAP layer processing section 50, an upper layer processing section 60, and an application layer processing section 80.

The IrSimple-IrLAP layer processing section 50 includes a frame analysis section 42, a connect request reception section 51, a disconnect request reception section 52, a connect command notification sections (connect command generation sections) 53, 54, a data transfer command notification section 55, a disconnect command notification section 56, and a flag counter 58.

The IrSimple-IrLAP layer processing section 50 is analogous to the data link layer in the OSI model, managing protocol for communications with another device. The frame analysis section 42 includes a connect frame analysis section 44, a data frame analysis section 46, and a disconnect frame analysis section 48. The connect frame analysis section 44 analyzes the connect frame received from the communications I/F section 30 for output to the connect command notification section 54. The data frame analysis section 46 analyzes the data frames received from the communications I/F section 30 for output to the data transfer command notification section 69. The disconnect frame analysis section 48 analyzes the disconnect frame received from the communications I/F section 30 for output to the disconnect command notification section 56. The frame analysis section 42 has another function: when it receives a data frame before receiving a connect frame, it generates a connect command similar to the one generated when it receives a connect frame for output to the connect command notification section 53.

The SNRM frame (connect frame) contains transmission conditions for the data frames which will be transmitted after the connect frame: namely, values of communications speed and frame interval.

The connect request reception section 51 is a connect request reception section in the IrSimple-IrLAP layer processing section 50. The section 51 receives a connect request from a connect request notification section 62 in the upper layer processing section 60 and transmits the request to the frame analysis section 42. The disconnect request reception section 52 is a disconnect request reception section in the IrSimple-IrLAP layer processing section 50. The section 52 receives a disconnect request from a disconnect request notification section 64 in the upper layer processing section 60 and transmits the request to the frame analysis section 42.

The connect command notification section 53 transmits a connect command to the connect command reception section 66 in the upper layer processing section 60. The connect command transmitted from the connect command notification section 53 to the connect command reception section 66 contains no connection parameters. The command is simply an instruction for the upper layers to carry out a connection process. Meanwhile, the connect command notification section 54 receives results of the analysis of the connect frame from the connect frame analysis section 44 and supplies a connect command to the connect command analysis section 68 in the upper layer processing section 60.

Figure 5:
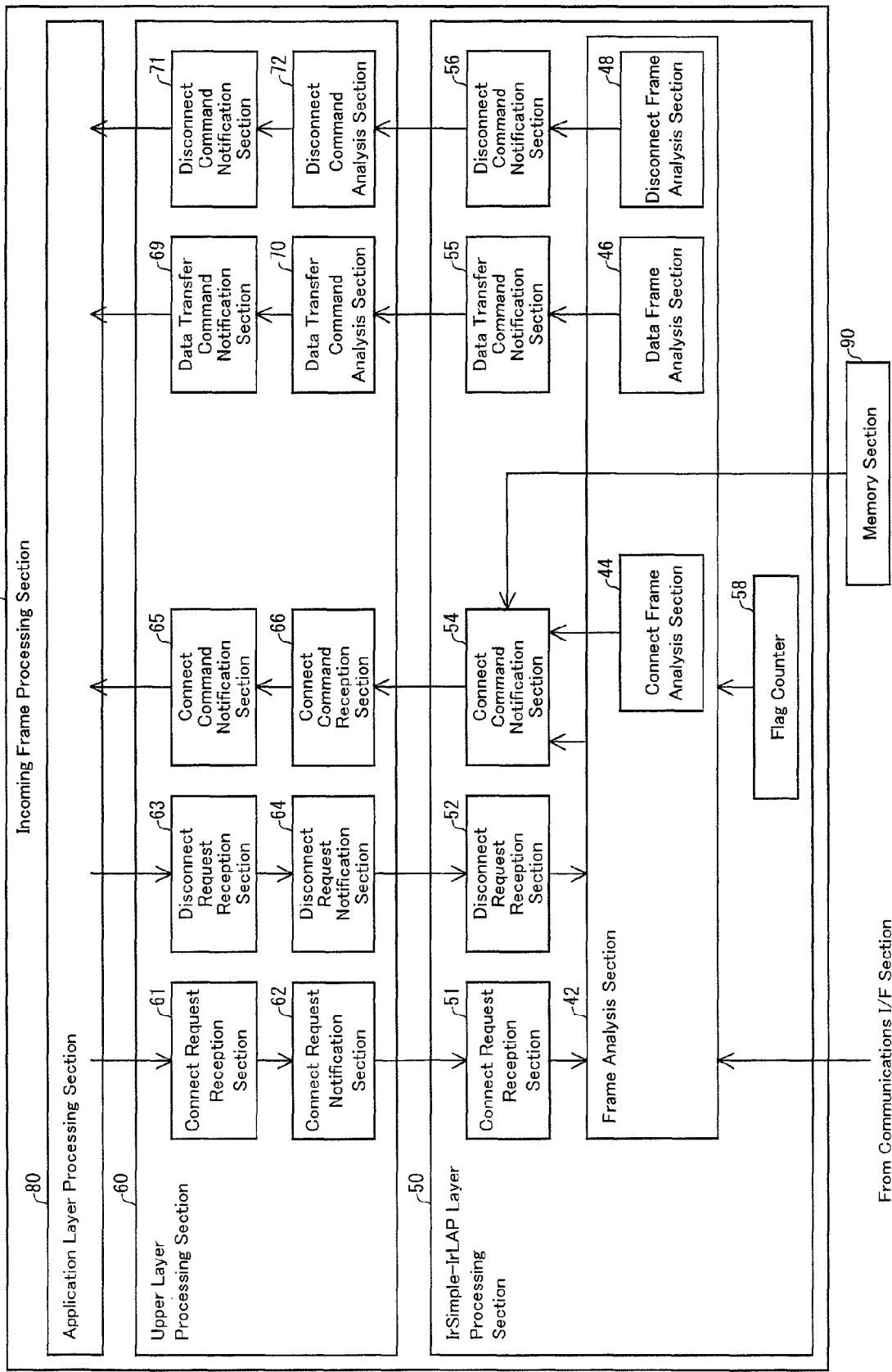
FIG. 5 is a functional block diagram of an alternative structure of the incoming frame processing section in the communications device.

Alternatively, the connect command notification section 54 may reads the connection parameters from the memory section 90 and generates a connect command for output to the connect command reception section 66 in the upper layer processing section 60 whenever necessary, even if there is no result of the analysis of the frames, as illustrated in FIG. 5. FIG. 5 is a functional block diagram of the incoming frame processing section 40 showing more details.

The data transfer command notification section 55 receives results of the data frame analysis from the data frame analysis section 46 and supplies a data transfer command to a data transfer command analysis section 70 in the upper layer processing section 60. The disconnect command notification section 56 receives results of the disconnect frame analysis from the disconnect frame analysis section 48 and supplies a disconnect command to a disconnect command analysis section 72 in the upper layer processing section 60.

The flag counter 58 manages, using a flag, whether or not the frame analysis section 42 needs to generate a connect command for output instead of outputting the results of analysis provided from the connect frame analysis section 44.

The upper layer processing section 60 is a processing section analogous to upper layers of the OSI model: namely, the IrSimple-IrLMP layer, the IrSMP layer, and the OBEX layer shown in FIG. 12.

The connect request reception section 61, the disconnect request reception section 63, the connect command notification sections 65, 67, the data transfer command notification section 69, and the disconnect command notification section 71 in the upper layer processing section 60 perform the same processing as the functional sections of the same name in the IrSimple-IrLAP layer processing section 50, that is, he connect request reception section 51, the disconnect request reception section 52, the connect command notification sections 53, 54, the data transfer command notification section 55, and the disconnect command notification section 56, respectively. Description of those sections is omitted.

The connect request notification section 62 sends a connect request to the connect request reception section 51 in the IrSimple-IrLAP layer processing section 50 (lower layer) in accordance with an instruction from the connect request reception section 61. The disconnect request notification section 64 sends a disconnect request to the disconnect request reception section 52 in the IrSimple-IrLAP layer processing section 50 (lower layer) in accordance with an instruction from the disconnect request reception section 63.

The connect command reception section 66 receives a connect command from connect command notification section 53 in the IrSimple-IrLAP layer processing section 50 (lower layer) for output to the connect command notification section 67. The connect command transmitted from the connect command notification section 53 to the connect command reception section 66 contains no connection parameters. The command is simply an instruction for the upper layers to carry out a connection process.

The connect command analysis section 68 receives a connect command from the connect command notification section 54 in the IrSimple-IrLAP layer processing section 50 (lower layer), analyzes the connect command, and supplies results of the analysis to the connect command notification section 67. The data transfer command analysis section 70 receives a data transfer command from the data transfer command notification section 55 in the IrSimple-IrLAP layer processing section 50 (lower layer) and analyzes the data transfer command for output to the data transfer command notification section 69. The disconnect command analysis section 72 receives a disconnect command from the disconnect command notification section 56 in the IrSimple-IrLAP layer processing section 50 (lower layer), analyzes the disconnect command, and supplies results of the analysis to the disconnect command notification section 71.

The output data from the notification sections mentioned above is sent further upward to the application layer processing section 80 for use in processing by the application. Detailed description is omitted here.

The description has so far assumed that the connect command notification section 53 in the IrSimple-IrLAP layer processing section 50 generates a connect command. Alternatively, the connect command notification section 65 in the upper layer processing section 60 may generate a connect command for output upward to the application layer processing section 80. Similar results are obtained no matter which communications layer has the function as the connect command generation section generating the connect command.

Figure 4:
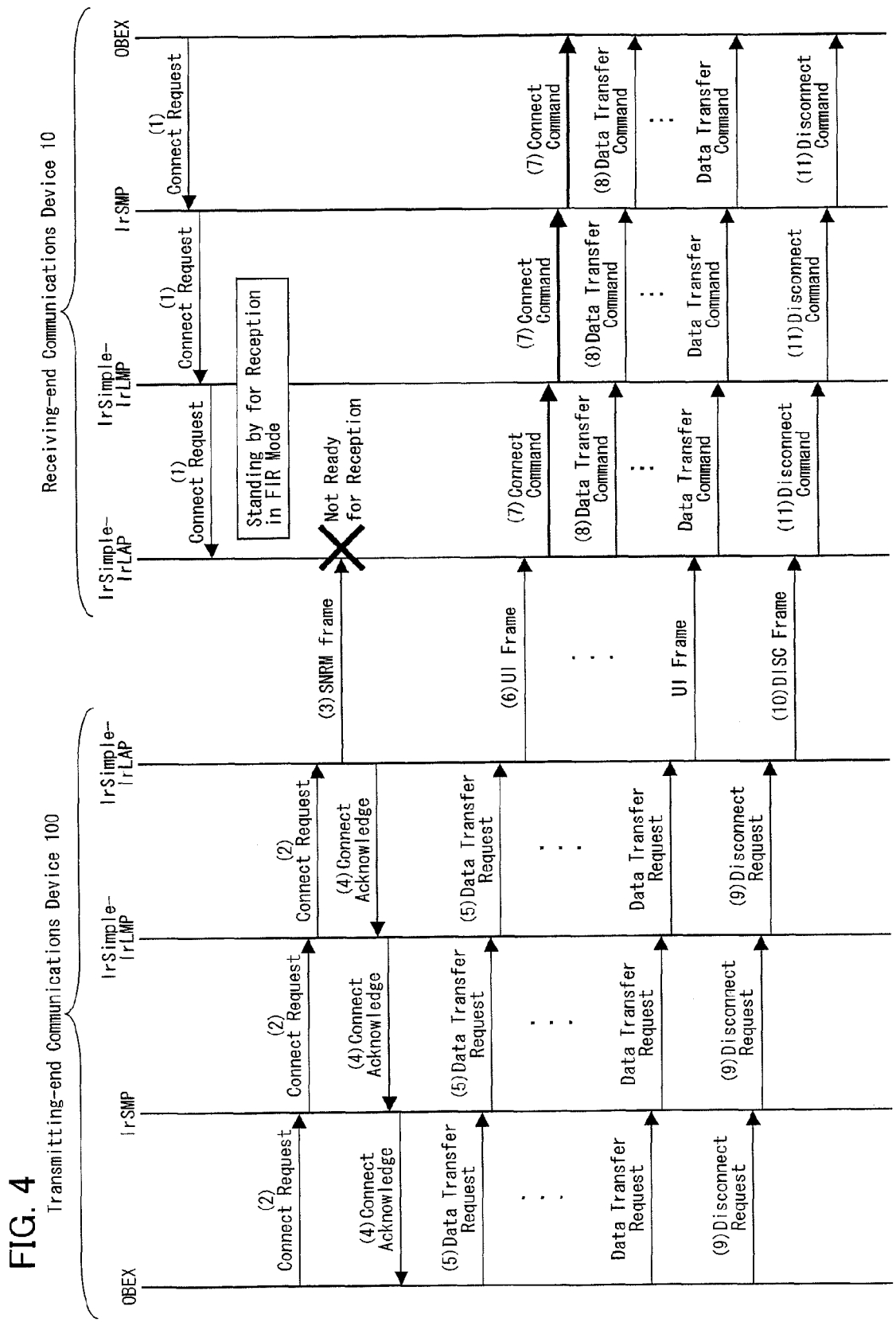
FIG. 4 is a detailed sequence drawing for the communications sequence for the communications device.

Next will be described the flow of a process carried out in IrSS-based one-way infrared communications in reference to FIG. 4. FIG. 4 is a sequence drawing for the flow of a process carried out by the transmitting-end communications device 100 and the receiving-end communications device 10 in IrSS-based one-way infrared communications.

The present embodiment assumes communications in a communications environment where there exists intense effect of infrared noise. The following will describe the device standing by for reception not in SIR communications mode which is prone to infrared noise, but in FIR communications mode which is unlikely to develop communications error due to infrared noise, as the communications scheme.

First, the OBEX layer in the receiving-end communications device 10 sends the connect request (1) to the connect request reception section 61 in the IrSMP layer. The connect request reception section 61 in the IrSMP layer analyzes the connect request and notifies the connect request notification section 62 of the reception of the connect request. The connect request notification section 62 in the IrSMP layer then sends the connect request (1) to the connect request reception section 61 in the IrSimple-IrLMP layer.

Likewise, the connect request reception section 61 in the IrSimple-IrLMP layer in the receiving-end communications device 10 receives an output from the connect request notification section 62 and sends a connect request to the connect request notification section 62. The connect request notification section 62 in the IrSimple-IrLMP layer sends the connect request (1) to the connect request reception section 51 in the IrSimple-IrLAP layer.

Furthermore, the connect request reception section 51 in the IrSimple-IrLAP layer in the receiving-end communications device 10 receives the connect request (1) for output to the frame analysis section 42. The frame analysis section 42 has the IrSimple-IrLAP layer 50 stand by for reception in FIR communications mode in accordance with the connect request (1).

Meanwhile, the OBEX layer in the transmitting-end communications device 100 sends the connect request (2) to the IrSMP layer. Likewise, the IrSMP layer sends the connect request (2) to the IrSimple-IrLMP layer. The IrSimple-IrLMP layer sends the connect request (2) to the IrSimple-IrLAP layer.

The IrSimple-IrLAP layer, upon receiving the connect request (2), transmits the SNRM frame (3) (connect frame) to the receiving-end communications device 10 in SIR communications mode via an infrared communications path.

After sending the connect request (2), the IrSimple-IrLAP layer in the transmitting-end communications device 100 sends the connect acknowledge (4) to the IrSimple-IrLMP layer. Likewise, the IrSimple-IrLMP layer sends the connect acknowledge (4) to the IrSMP layer. The IrSMP layer sends the connect acknowledge (4) to the OBEX layer.

The layers in the transmitting-end communications device 100 carry out the connection process by the procedures detailed above, completing the establishing of a communications line between the transmitting-end communications device 100 and the receiving-end communications device 10.

On the other hand, in the receiving-end communications device 10, the IrSimple-IrLAP layer is standing by for reception in FIR communications mode and as a result cannot receive the SNRM frame (3) in SIR communications mode. The layers in the receiving-end communications device 10 therefore have not carried out a connection process.

Next, the OBEX layer in the transmitting-end communications device 100 sends the data transfer request (5) to the IrSMP layer. Likewise, the IrSMP layer sends the data transfer request (5) to the IrSimple-IrLMP layer. The IrSimple-IrLMP layer sends the data transfer request (5) to the IrSimple-IrLAP layer. The IrSimple-IrLAP layer receives the data transfer request (5) and sends the UI frames (6) (data frames) in FIR communications mode.

Since standing by for reception in FIR communications mode, the IrSimple-IrLAP layer in the receiving-end communications device 10 can receive the UI frames (6) transmitted in FIR communications mode. The frame analysis section 42 in the receiving-end communications device 10 carries out a connection process for the IrSimple-IrLAP layer in accordance with the results of the analysis that the received frames are UI frames and instructs the connect command notification section 53 to generate the connect command (7) for output to the upper layer.

The connect command (7) contains no connection parameters representing transmission conditions for subsequent data frames. The command is simply an instruction for the upper layers to establish a connection. The frame analysis section 42 sends the UI frames to the data frame analysis section 46. The data frame analysis section 46 sends results of analysis to the data transfer command notification section 55.

Next, in response to the instruction from the frame analysis section 42, the connect command notification section 53 sends the connect command (7) to the connect command reception section 66 in the IrSimple-IrLMP layer. Subsequently, the data transfer command notification section 55 sends the data transfer command (8) to the data transfer command analysis section 70 in the IrSimple-IrLMP layer in accordance with the analysis by the data frame analysis section 46.

The connect command reception section 66 in the IrSimple-IrLMP layer sends a connect command to the connect command notification section 65. The data transfer command analysis section 70 sends a data transfer command to the data transfer command notification section 69. In accordance with the data transfer command, the upper layer processing section 60 carries out a connection process for the IrSimple-IrLMP layer and the IrSMP layer (upper layer of the IrSimple-IrLMP layer). Accordingly, the data transfer command can be transferred to an upper layer.

The upper layer processing section 60 sends a connect command and a data transfer command to the connect command notification section 67 and the data transfer command notification section 69 respectively. The connect command notification section 67 and the data transfer command notification section 69 output the connect command (7) and the data transfer command (8) respectively to the IrSMP layer. The real file of the image data is thus divided up into a plurality of data frames for transmission.

As the transmission of the image data divided into the plurality of data frames is completed, the OBEX layer in the transmitting-end communications device 100 transmits the disconnect request (9) to the IrSMP layer. The IrSMP layer sends the disconnect request (9) to the IrSimple-IrLMP layer. The IrSimple-IrLMP layer sends the disconnect request (9) to the IrSimple-IrLAP layer. The IrSimple-IrLAP layer transmits the DISC frame (10) (disconnect frame) to the receiving-end communications device 10 via infrared communications in accordance with the disconnect request (9).

In the receiving-end communications device 10, the IrSimple-IrLAP layer, upon receiving the DISC frame (10), sends the disconnect command (11) to the IrSimple-IrLMP layer. Likewise, the IrSimple-IrLMP layer sends the disconnect command (11) to the IrSMP layer. The IrSMP layer sends the disconnect command (11) to the OBEX layer. Accordingly, the layers in the receiving-end communications device 10 carry out a disconnection process, discontinuing the connection.

If no connect frame from the transmitting-end communications device 100 is received, the connection process for the layers may be carried out using predetermined connection parameters by, for example, the IrSimple-IrLAP layer in the receiving-end communications device 10 generating a connect command in which the connection parameters are set to default values.

If no connect frame from the transmitting-end communications device 100 on the transmitting-end is received, the IrSimple-IrLAP layer in the receiving-end communications device 10 may generate a connect command which contains no connection parameters, but which is simply an instruction for the layers to carry out a connection process. The upper layer processing section 60 receives inputs from the connect request reception section 51, the connect command analysis section 68, etc. and controls outputs to the connect request notification section 62, the connect command notification section 54, etc.

In the receiving-end communications device 10 detailed above, the IrSimple-IrLAP layer does not send connection parameters representing data frame transmission conditions to the upper layers, but simply instructs the layers to carry out a connection process.

The arrangement enables the connection process to be carried out without the generation of connection parameters. The communications can continue without having to receive connection parameters from the connect frame.

Meanwhile, the IrSimple-IrLAP layer processing section 50 receives results of the analysis of the received frame from the frame analysis section 42 and determines whether the received frame is a connect frame, a data frame, or a disconnect frame which the section 50 sends respectively to the connect frame analysis section 44, the data frame analysis section 46, and the disconnect frame analysis section 48. Alternatively, the IrSimple-IrLAP layer processing section 50 instructs the connect command notification section 65 to send a connect command containing no connection parameters where necessary even if the connect frame analysis section 44 contains no results of analysis of a connect frame.

As described in the foregoing, the receiving-end communications device 10 according to the present embodiment is a receiving-end communications device 10 including an incoming frame processing section 40 receiving an SNRM frame and UI frames in different frame formats from a transmitting-end communications device 100 on another end of the communications. The SNRM frame specifies connection settings for data communications. The UI frames transmit data. The communications device 10 includes a reception processing section 20 and connect command notification sections 53, 54. Upon receiving a connect request from an IrSimple-IrLMP layer (upper layer), the reception processing section 20 renders an incoming frame processing section 40 stand by for reception of the UI frames in FIR communications mode. After the incoming frame processing section 40 is rendered to stand by in FIR communications mode, the connect command notification sections 53, 54 generate and send a connect command to the IrSimple-IrLMP layer (upper layer).

The communications method according to the present invention is a communications method implemented by a receiving-end communications device 10 including an incoming frame processing section 40 receiving an SNRM frame and UI frames in different frame formats from a transmitting-end communications device 100 on another end of the communications. The SNRM frame specifies connection settings for data communications. The UI frames transmit data. The method includes the step of, upon receiving a connect request from an IrSimple-IrLMP layer (upper layer), rendering an incoming frame processing section 40 stand by for reception of the UI frames in FIR communications mode and the step of, after the incoming frame processing section 40 is rendered to stand by in FIR communications mode, generating and sending a connect command to the IrSimple-IrLMP layer (upper layer).

According to the arrangement, when the connect frame and the data frames are transmitted in different communications modes, specifically, at two or more different communications speeds, modulation schemes, or various other communications conditions, the data frames can be received in FIR communications mode even if the connect frame cannot be normally received in SIR communications mode. Therefore, the arrangement increases the probability of successfully receiving subsequent data frames.

In the receiving-end communications device 10 according to the present embodiment, the connect command notification sections 53, 54 generate a connect command based on predetermined values stored in the memory section 90. The values are settings predicted to be specified in a connect frame if the connect frame is received from another device involved in communications.

According to the arrangement, the connect command is generated based on the predetermined communications condition settings stored in the memory section 90. Therefore, even if the connect frame containing setting information needed to establish a connection cannot be received, normal communications can be continued by preparing in advance arbitrary communications conditions.

In the receiving-end communications device 10 according to the present embodiment, the incoming frame processing section 40 performs communications via infrared-based communications path.

According to the arrangement, a communications connection can be established in such a communications environment that a connect frame cannot be normally received due to infrared noise and other factors in data communications.

The connect command notification section 53 may generate the connect command based on default values which are predetermined in the IrDA and like communications standards as transmission conditions for subsequent data frames.

In the description above, the first communications mode has been assumed to be SIR communications mode whose transmission speed is slow, whilst the second communications mode has been assumed to be FIR communications mode whose transmission speed is fast. This is by no means intended to be limiting the invention. The first communications mode and the second communications mode may be a high carrier frequency mode and a low carrier frequency mode or a modulation scheme in which data values are represented by the presence/absence of a pulse in a predetermined period and a modulation scheme in which values in a frame are represented by the position of a pulse on the time axis in a predetermined period. Also, although the first communications mode and the second communications mode have been assumed to be differ in the description above, the modes may be the same.

SIR and FIR modulation schemes have been taken as exemplary modulation schemes. VFIR (Very Fast Infrared) modulation may be used in place of FIR.

The description has so far dealt with IrSS-based one-way infrared communications. Infrared is however not the only possibility. The communications may be performed by light in a visible range which has similar properties to infrared. For example, visible light communications become possible by simply replacing the infrared LED and the light reception section 22 with a light emission section and a light reception section which are compatible with visible light. The present invention is very effective in visible light communications because noise-inducing conditions are likely to occur than in infrared communications, for example, in proximity of an inverter-type fluorescence lamp.

Still, the present invention is particularly effects by the following mechanism when it is applied to IrSS-based one-way infrared communications as in the present embodiment. In an environment where there occurs lot of infrared noise and communications errors are likely to occur with the SNRM frame (connect frame), the IrSimple-IrLAP layer (data link layer) in the receiving-end communications device 10 generates the connect command for output to the IrSimple-IrLMP layer (network layer) without having to receive the SNRM frame in SIR communications mode so that each layer having received the connect command can send the connect command to its upper layer where a connection is established. That enables reception of the succeeding UI frames (data frames) in FIR communications mode.

Embodiment 2

The receiving-end communications device 10 of the present embodiment differs from the system shown in FIGS. 1 to 5 in the configuration of a data transfer command analysis section 70 in an IrSMP layer processing section 94, but is otherwise the same. Members of the present embodiment that have the same arrangement and function as members of the previous embodiment, and that are mentioned in that embodiment are indicated by the same reference numerals and description thereof is omitted.

Figure 6:
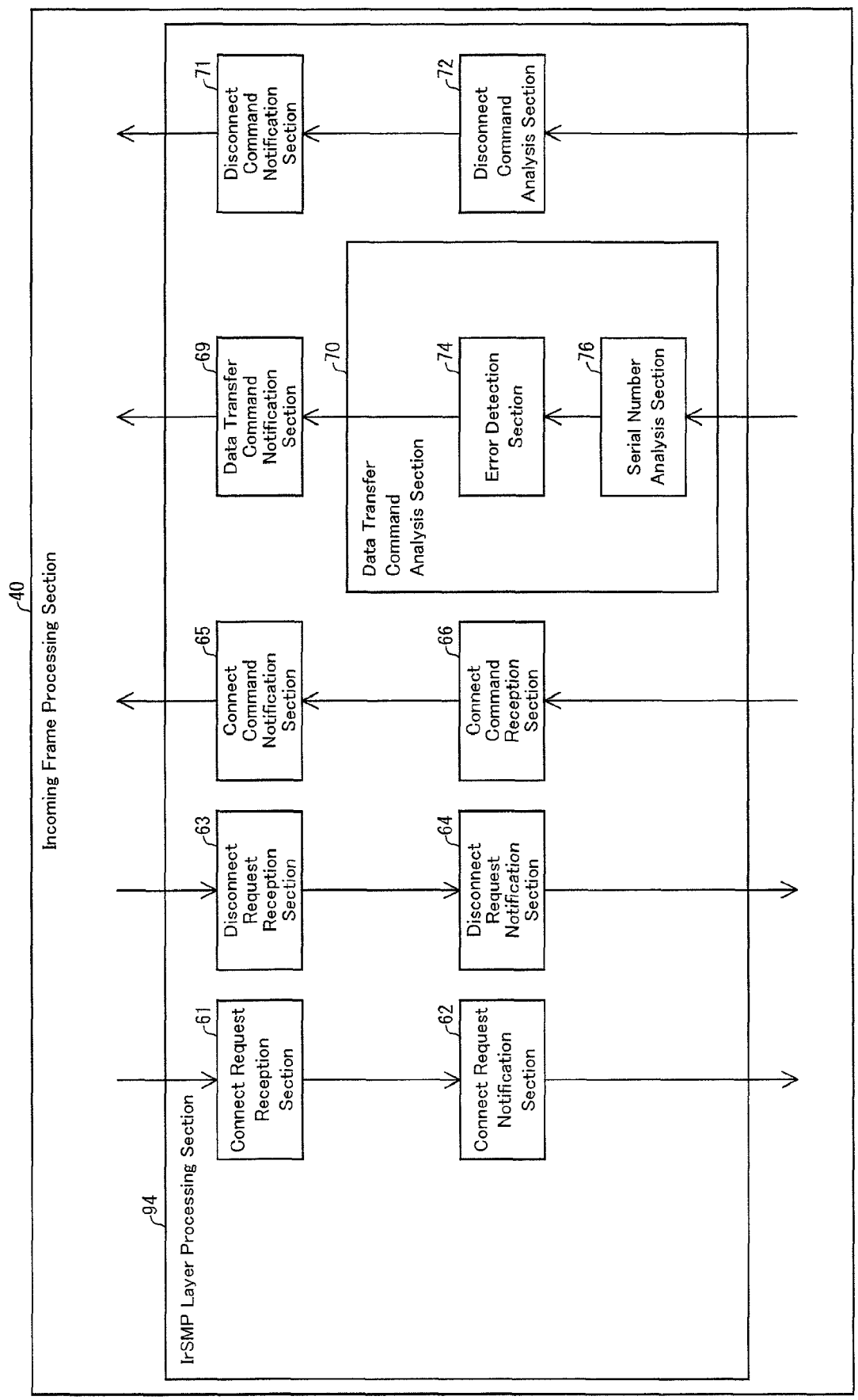
FIG. 6, illustrating another embodiment, is a functional block diagram of the structure of an incoming frame processing section that detects frame errors.
Figure 7:
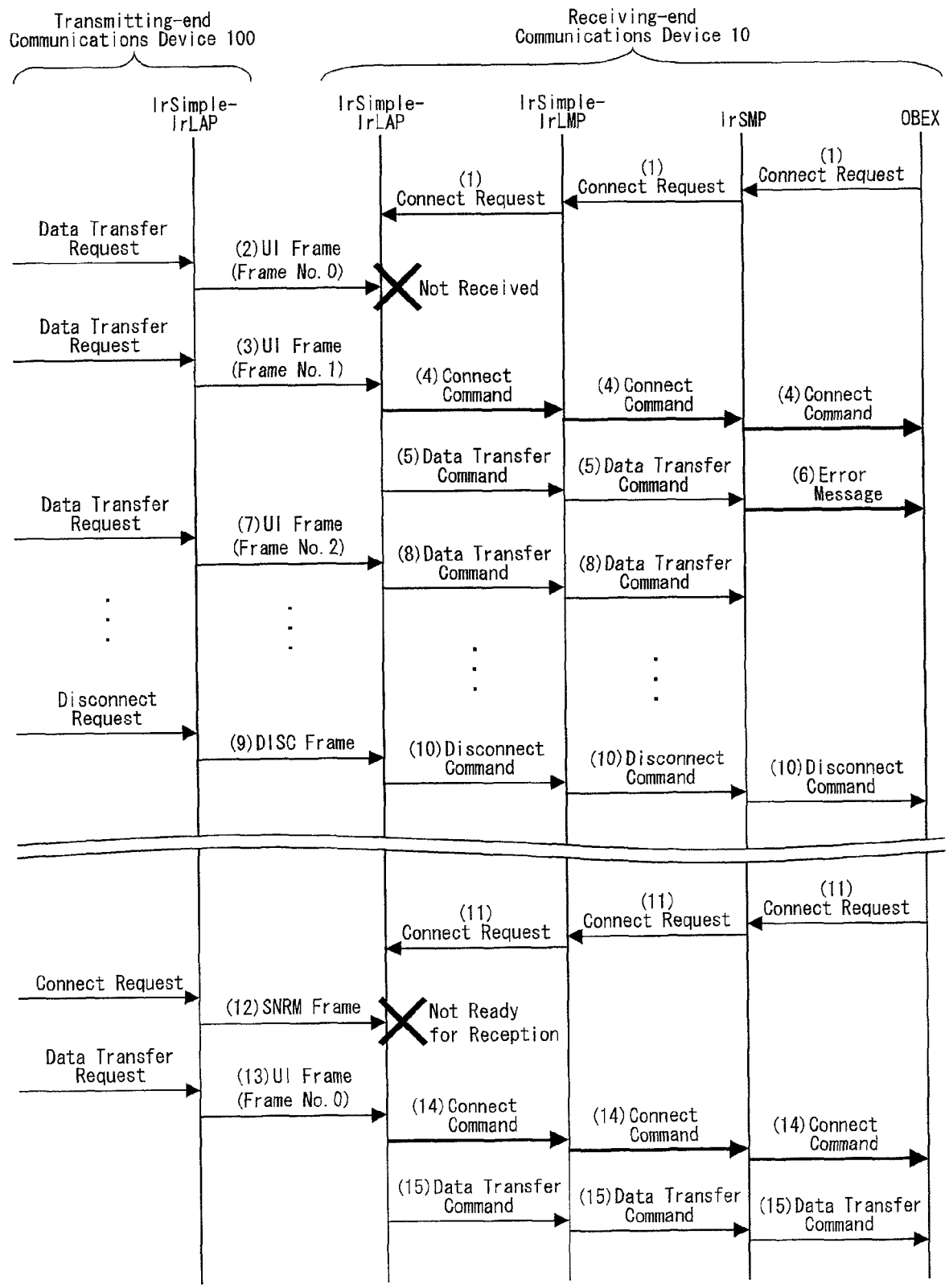
FIG. 7 is a sequence drawing for a reception sequence for the structure shown in FIG. 6.
Figure 8:
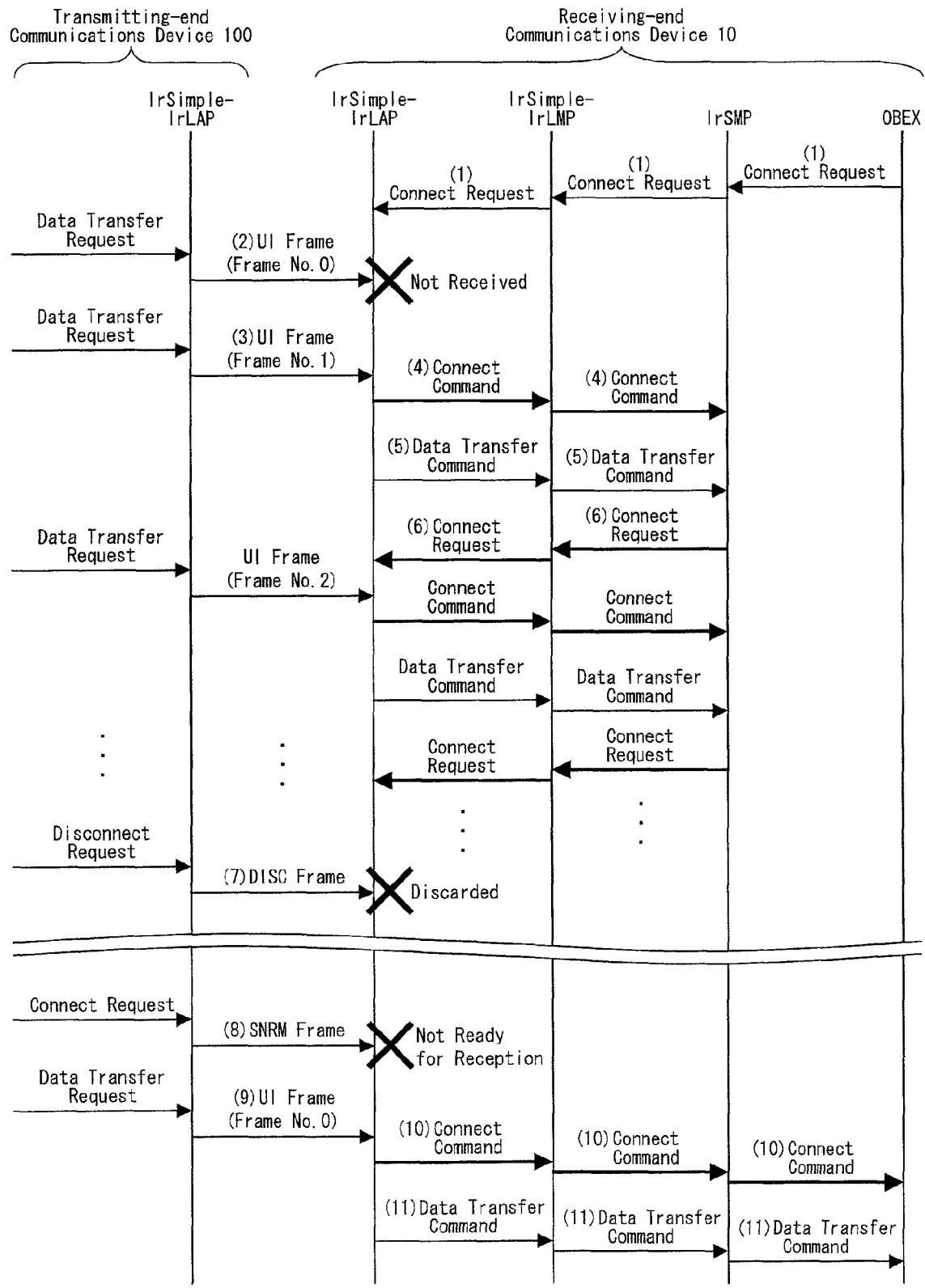
FIG. 8 is a sequence drawing for an alternative reception sequence for the structure shown in FIG. 6.

The following will describe a frame error detecting operation in the above configuration in reference to FIGS. 6 to 8. FIG. 6 is a functional block diagram of the configuration of an incoming frame processing section 40 of the present embodiment. FIG. 7 is a sequence drawing for a reception sequence in the configuration shown in FIG. 6. FIG. 8 is a sequence drawing for another reception sequence in the configuration shown in FIG. 6.

The data transfer command analysis section (frame monitoring section) 70 of the present embodiment includes an error detection section 74 and a serial number analysis section 76. The IrSMP layer processing section 94 is a transport layer in the OSI model and manages the flow of data frames using frame numbers.

The data transfer command analysis section 70 analyzes a data transfer command received from a data transfer command notification section in the IrSimple-IrLMP layer for output to a frame analysis section 42.

If sequentially incoming data frames (UI frames) do not have sequential frame numbers or if the first incoming UI frame has a frame number that is not the starting frame number (non-zero frame number), the error detection section 74 determines that a frame error has occurred. The serial number analysis section 76 analyzes frame numbers by using the sequential frame numbers assigned to the data frames (UI frames).

For example, when the transmitting-end communications device 100 repeatedly and continuously performs transmission using the one-way communications nature of the IrSS, the receiving-end communications device could start reception somewhere in the middle of the communications sequence. Consequently, the receiving-end communications device may receive UI frames starting from a UI frame that is not the UT frame of the starting frame number (frame number 0).

When the UI frame that is received first has a non-zero frame number, a communications error occurs if the same frame error processing is carried out as conventional missing UT frame processing. To address the problem, when the UT frame received first by the receiving-end communications device 10 has a non-zero frame number, the operation detailed below is preferably performed.

Referring to the sequence drawing in FIG. 7, an operation will be described which is performed when the IrSimple-IrLAP layer starts receiving UT frames somewhere in the middle of the sequence starting from a UT frame of frame number 1 (non-zero) and does not receive the UI frame of frame number 0.

In the receiving-end communications device 10, the IrSimple-IrLAP layer receives a connect request (1) via the OBEX layer, the IrSMP layer, and the IrSimple-IrLMP layer. The receiving-end communications device 10 is standing by for reception in FIR communications mode without receiving a UT frame (2) of frame number 0.

The IrSimple-IrLAP layer, upon receiving a UT frame (3) of frame number 1, sends a connect command (4) and a data transfer command (5) to the IrSimple-IrLMP layer.

Likewise, the IrSimple-IrLMP layer sends the connect command (4) and the data transfer command (5) to the IrSMP layer. The IrSMP layer sends the connect command (4) to the OBEX layer, and upon detecting that the UI frame is frame number 1 (non-zero), sends a frame error (6) to the OBEX layer.

For the succeeding UI frames (7), the IrSimple-IrLAP layer sends a data transfer command (8) to the IrSimple-IrLMP layer, and the IrSimple-IrLMP layer sends a data transfer command (8) to the IrSMP layer. The IrSMP layer however does not send the data transfer command (8) to the OBEX layer.

Thereafter, upon receiving a DISC frame (9), the IrSimple-IrLAP layer sends a disconnect command (10) to the IrSimple-IrLMP layer. Likewise, the IrSimple-IrLMP layer sends the disconnect command (10) to the IrSMP layer, and the IrSMP layer sends the disconnect command (10) to the OBEX layer. Accordingly, the layers in the receiving-end communications device 10 performs a disconnection process to discontinue the connection.

Immediately after that, the OBEX layer in the receiving-end communications device 10 sends a connect request (11) to the IrSMP layer. The connect request (11) reaches the IrSimple-IrLAP layer via the IrSimple-IrLMP layer, rendering the IrSimple-IrLAP layer stand by for reception again in FIR communications mode.

Next, the transmitting-end communications device 100 transmits an SNRM frame (12) in SIR communications mode. Since the receiving-end communications device 10 is standing by for reception in FIR communications mode, the communications device cannot receive the SNRM frame (12). Subsequently, the transmitting-end communications device 100 transmits a UI frame (13) of frame number 0.

The IrSimple-IrLAP layer in the receiving-end communications device 10, upon receiving the UI frame (13) of frame number 0, sends a connect command (14) and a data transfer command (15) to the IrSimple-IrLMP layer. Likewise, the IrSimple-IrLMP layer sends the connect command (14) and the data transfer command (15) to the IrSMP layer.

The IrSMP layer sends the connect command (14) to the OBEX layer, and upon detecting that the UI frame is frame number 0, sends a data transfer command (15) to the OBEX layer.

The receiving-end communications device 10 may alternatively operate as follows if it receives UI frames starting from a non-frame-number-zero UI frame. A communications sequence will be described in reference to FIG. 8.

In the receiving-end communications device 10, the IrSimple-IrLAP layer receives a connect request (1) via the OBEX layer, the IrSMP layer, and the IrSimple-IrLMP layer. The receiving-end communications device 10 is standing by for reception in FIR communications mode without receiving a UI frame (2) of frame number 0.

The IrSimple-IrLAP layer, upon receiving a UI frame (3) of frame number 1 (non-zero), sends a connect command (4) and a data transfer command (5) to the IrSimple-IrLMP layer. Likewise, the IrSimple-IrLMP layer sends the connect command (4) and the data transfer command (5) to the IrSMP layer. The IrSMP layer, upon detecting that the UI frame (3) is frame number 1 (non-zero), discontinues the connection and sends a connect request (6) to the IrSimple-IrLMP layer.

Receiving the connect request (6), the IrSimple-IrLMP layer discontinues the connection and sends the connect request (6) to the IrSimple-IrLAP layer. The IrSimple-IrLAP layer also discontinues the connection and turn into reception standby in FIR communications mode. The same actions are carried out for succeeding non-frame-number-zero UI frames. Thereafter, although the IrSimple-IrLAP layer receives a DISC frame (7), the IrSimple-IrLAP layer discards the DISC frame (7) because the IrSimple-IrLAP layer has not established a connection.

Next, the receiving-end communications device 10 transmits an SNRM frame (8) in SIR communications mode. Since the receiving-end communications device 10 is standing by for reception in FIR communications mode, the communications device cannot receive the SNRM frame. Subsequently, the transmitting-end communications device 100 transmits a UI frame (9) of frame number 0.

The IrSimple-IrLAP layer in the receiving-end communications device 10, upon receiving the UI frame (9) of frame number 0, sends a connect command (10) and a data transfer command (11) to the IrSimple-IrLMP layer. Likewise, the IrSimple-IrLMP layer sends the connect command (10) and the data transfer command (11) to the IrSMP layer. The IrSMP layer, upon detecting that the UI frame is frame number 0, sends the connect command (10) and the data transfer command (11) to the OBEX layer.

The above description has assumed that it is the OBEX layer that initially sends the connect request and ultimately receives the data transfer command and the disconnect command. These roles are not necessarily taken on by the OBEX layer. The application layer (upper layer to the OBEX layer) may take on the roles.

As described in the foregoing, the receiving-end communications device 10 of the present embodiment further includes the error detection section 74 monitoring the data frames received by the incoming frame processing section 40. The error detection section 74, upon detecting that the incoming frame processing section 40 has received a frame which does not have the starting frame number, notifies the OBEX layer (upper layer) of the error and suspends the transmission of subsequently received data frames to the upper layer.

The receiving-end communications device 10 of the present embodiment further includes the error detection section 74 monitoring the frame numbers of the data frames received by the incoming frame processing section 40. Upon the error detection section 74 detecting that the incoming frame processing section 40 has received a frame which does not have the starting frame number, the reception processing section 20 renders the IrSimple-IrLAP layer stand by in a communications mode in which a connect frame is received.

According to the arrangement, the error detection section 74 monitors incoming data frames. If data frame reception cannot be normally continued in accordance with the connect command generated by the connect command notification sections 53, 54, the transfer of the data that cannot be received under current conditions to the upper layer is discontinued. The arrangement hence prevents occurrence of communications error when the receiving-end communications device 10 starts receiving data frames in the middle of the sequence in communications with the transmitting-end communications device 100 in which the data frames are transmitted repeatedly according to the one-way communications sequence.

Embodiment 3

The receiving-end communications device 10 of the present embodiment differs from the system shown in FIGS. 1 to 8 in that the receiving-end communications device 10 includes an elapsed time analysis section 84 measuring the time elapsed after the establishing of a connection and determines whether or not the elapsed time is longer than or equal to a predetermined time or shorter than or equal to a predetermined time, but is otherwise the same. Members of the present embodiment that have the same arrangement and function as members of the previous embodiments, and that are mentioned in those embodiments are indicated by the same reference numerals and description thereof is omitted.

Figure 11:
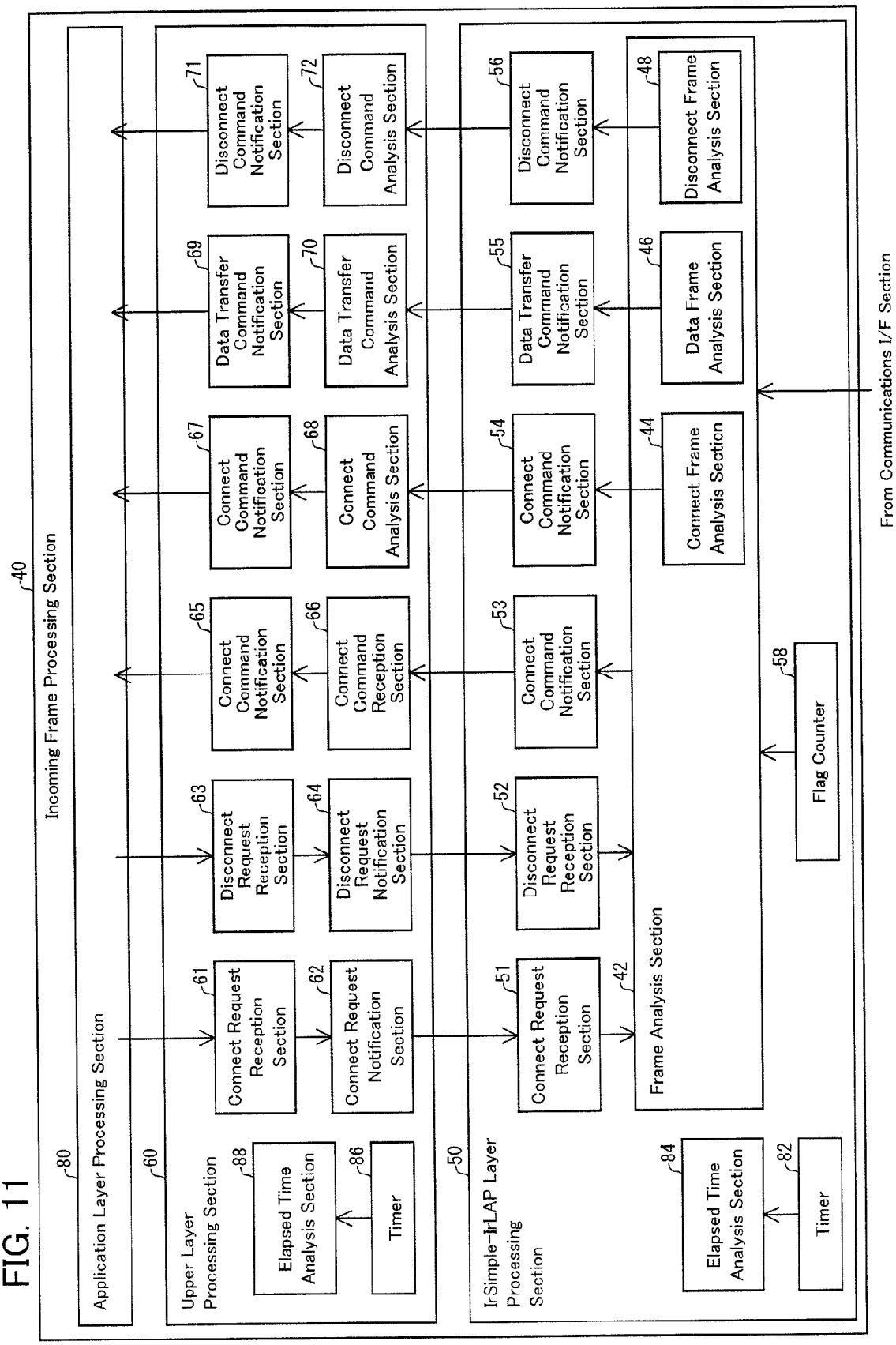
FIG. 11 is a block diagram of a structure including an elapsed time analysis section in the communications device.

FIG. 11 is a functional block for an incoming frame processing section 40 in accordance with the present embodiment. The IrSimple-IrLAP layer 50 shown in FIG. 11 includes a timer 82 and an elapsed time analysis section 84.

The timer 82, in response to a command from the frame analysis section 42, measures the time elapsed after the establishing of a connection based on a connect command generated by the IrSimple-IrLAP layer. The elapsed time analysis section 84 determines whether or not the elapsed time measurement on the timer 82 exceeds a predetermined time and notifies a result of the frame analysis section 42. The timer 82 and the elapsed time analysis section 84 may be included either in each of the IrSimple-IrLAP layer, the IrSimple-IrLMP layer, the IrSMP layer, and the OBEX layer or in some of the layers. Alternatively, the timer 82 may start measuring the elapsed time when the connect command notification sections 53, 54 send the connect command.

In the above arrangement, when a predetermined time has elapsed after the establishing of the connection of the layers based on the connect command generated by the IrSimple-IrLAP layer, the OBEX layer in the receiving-end communications device 10 may send a disconnect request to the IrSMP layer, the IrSMP layer likewise may send a disconnect request to the IrSimple-IrLMP layer, and the IrSimple-IrLMP layer may send a disconnect request to the IrSimple-IrLAP layer. Accordingly, the situation is prevented in which the connection of the layers of the receiving-end communications device 10 is continuously maintained in spite of absence of the transmitting-end communications device 100 in the surroundings of the receiving-end communications device 10.

Alternatively, if an SNRM frame transmitted by the transmitting-end communications device 100 is received after a predetermined time has elapsed from the establishing of the connection using the connect command generated the IrSimple-IrLAP layer of the receiving-end communications device 10, the IrSimple-IrLAP layer may send a new connect command to the IrSimple-IrLMP layer. The arrangement enables transmission conditions for UI frames to be set using the connection parameters contained in the SNRM frame transmitted by the transmitting-end communications device 100. The succeeding UI frames are thus more reliably received than when the connection is established using a connect command sent from the IrSimple-IrLAP layer.

The connect command generated by the data link layer in the receiving-end communications device 10 may be used to establish a connection also when the receiving-end communications device 10 has received the connect frame transmitted from the transmitting-end communications device 100.

The above description has assumed that it is the OBEX layer that initially sends the connect request and ultimately receives the data transfer command and the disconnect command. These roles are not necessarily taken on by the OBEX layer. The application layer (upper layer to the OBEX layer) may take on the roles.

As described in the foregoing, the receiving-end communications device 10 of the present embodiment includes the elapsed time analysis section 84 measuring the time elapsed after the connect command notification sections 53, 54 send a connect command to the upper layer.

The above arrangement enables execution of a suitable process by determining the success/failure of the communications connection based on the time elapsed after the connect command is sent.

The disconnect command notification section 64 in the receiving-end communications device 10 may send a disconnect command to the upper layer when the time measured by the elapsed time analysis section 84 has reached a predetermined time.

The arrangement prevents a situation in which a data receiving connection is continuously maintained in spite of absence of a communications terminal (e.g. the transmitting-end communications device 100) which is the destination in the communications in the surroundings.

If the incoming frame processing section 40 receives an SNRM frame after the time measured by the elapsed time analysis section 84 has reached the predetermined time, the connect command notification sections 53, 54 in the receiving-end communications device 10 may disregard the SNRM frame.

In the receiving-end communications device 10, the connect command notification sections 53, 54 generate the connect command before the SNRM frame is received. Thus, after the SNRM frame is received, the receiving-end communications device 10 may continue the communications by switching to the data frame transmission conditions contained in the received SNRM frame or by using the data frame transmission conditions contained in the connect command generated by the connect command notification sections 53, 54, whichever method is appropriate.

Therefore, when the communications have been carried out sufficiently based on the data frame transmission conditions contained in the connect command generated by the connect command notification sections 53, 54, even if an SNRM frame containing data frame transmission conditions from the transmitting-end communications device 100 is received, the reception processing section 20 does not have perform a new connection process by continuing the communications using the connect command generated by the connect command notification sections 53, 54. Process workload can be thus reduced.

The description above has assumed a scheme based on SIR communications mode and a scheme based on FIR communications mode. This is by no means intended to be limiting the invention. The two modes may be a high carrier frequency mode and a low carrier frequency mode or a modulation scheme in which data values are represented by the presence/absence of a pulse in a predetermined period and a modulation scheme in which values in a frame are represented by the position of a pulse on the time axis in a predetermined period. Also, although the two communications modes have been assumed to differ in the description above, they may be the same.

In the receiving-end communications device 10 of the present embodiment, if the light reception section 22 receives an SNRM frame before the time measured by the elapsed time analysis section 84 reaches the predetermined time, the connect command notification sections 53, 54 may generate a connect command using values specified in the SNRM connect frame and output the connect command to the upper layer.

According to the above arrangement, the data frame transmission conditions can be specified using the connection parameters contained in the SNRM frame transmitted by the transmitting-end communications device 100. Therefore, the communications are thus more reliably performed than when the connection is established using the connect command generated by the connect command notification sections 53, 54.

Embodiment 4

The receiving-end communications device 10 of the present embodiment differs from the system shown in FIGS. 1 to 8 in that the receiving-end communications device 10 sends the connect command at a different timing, but is otherwise the same. Members of the present embodiment that have the same arrangement and function as members of the previous embodiments, and that are mentioned in those embodiments are indicated by the same reference numerals and description thereof is omitted.

Figure 9:
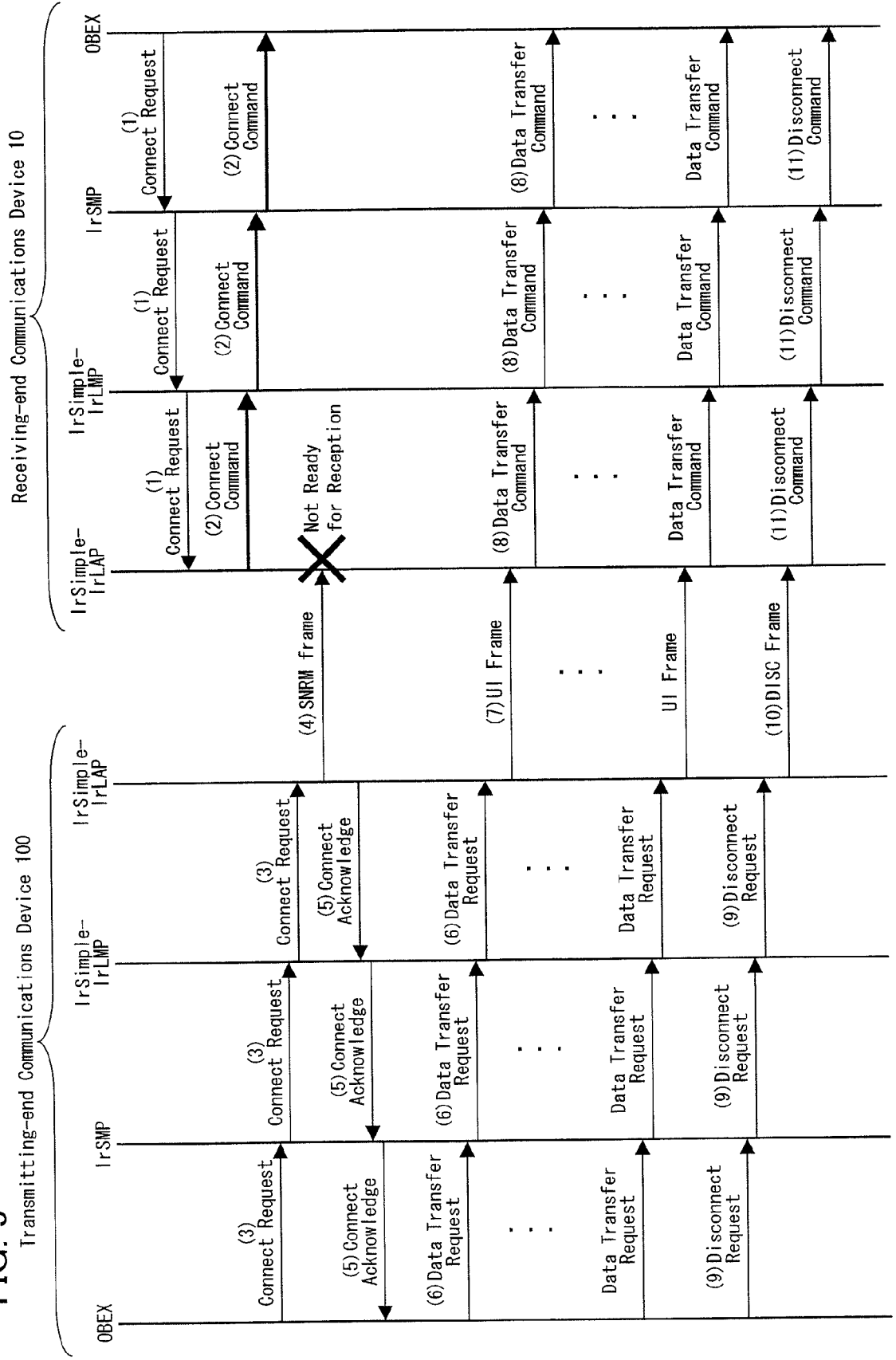
FIG. 9, illustrating another embodiment, is a sequence drawing for a reception sequence in which a connect command is issued at a different timing.
Figure 10:
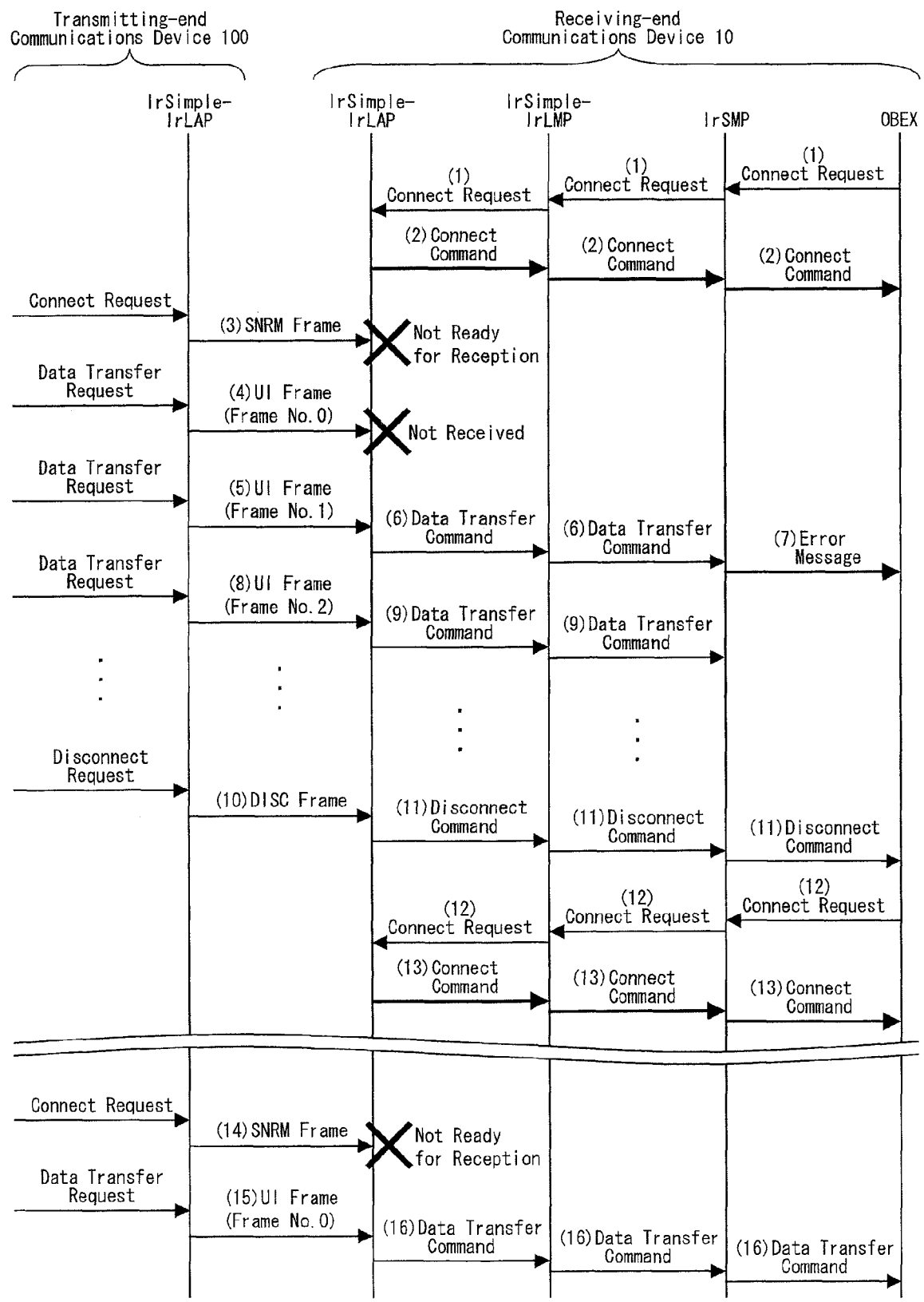
FIG. 10 is a sequence drawing for an operation in the case of a frame transmission failure.

The following will describe an operation from the start of communications to a disconnection in the configuration in reference to FIGS. 9 and 10. FIG. 9 is a sequence drawing for a reception sequence in accordance with the present embodiment. FIG. 10 is a sequence drawing for a process carried out when a data frame error is detected in the reception sequence shown in FIG. 9.

First, a basic reception sequence implemented in the receiving-end communications device 10 of the present embodiment will be described in reference to FIG. 9. The OBEX layer in the receiving-end communications device 10 sends a connect request (1) to the IrSMP layer. Likewise, the IrSMP layer sends the connect request (1) to the IrSimple-IrLMP layer. The IrSimple-IrLMP layer sends the connect request (1) to the IrSimple-IrLAP layer. The IrSimple-IrLAP layer, upon receiving the connect request (1), stands by for reception in FIR communications mode.

Next, the IrSimple-IrLAP layer sends a connect command (2) to the IrSimple-IrLMP layer. Likewise, the IrSimple-IrLMP layer sends the connect command (2) to the IrSMP layer. The IrSMP layer sends the connect command (2) to the OBEX layer. As a result, the layers execute a connection process, successfully establishing a communications line.

Meanwhile, the OBEX layer in the transmitting-end communications device 100 sends a connect request (3) to the IrSMP layer. Likewise, the IrSMP layer sends the connect request (3) to the IrSimple-IrLMP layer. The IrSimple-IrLMP layer sends the connect request (3) to the IrSimple-IrLAP layer. The IrSimple-IrLAP layer, upon receiving the connect request (3), transmits an SNRM frame (4) in SIR communications mode.

Thereafter, the IrSimple-IrLAP layer in the transmitting-end communications device 100 sends a connect acknowledge (5) to the IrSimple-IrLMP layer. Likewise, the IrSimple-IrLMP layer sends the connect acknowledge (5) to the IrSMP layer. The IrSMP layer sends the connect acknowledge (5) to the OBEX layer.

The layers in the transmitting-end communications device 100 carry out the connection process by the procedures detailed above, completing the establishing of a communications line. UI frames are thus received normally. However, the IrSimple-IrLAP layer in the receiving-end communications device 10 is standing by for reception in FIR communications mode and as a result cannot receive the SNRM frame (4) in SIR communications mode.

Next, the OBEX layer in the transmitting-end communications device 100 sends a data transfer request (6) to the IrSMP layer. Likewise, the IrSMP layer sends the data transfer request (6) to the IrSimple-IrLMP layer. The IrSimple-IrLMP layer sends the data transfer request (6) to the IrSimple-IrLAP layer. The IrSimple-IrLAP layer, upon receiving the data transfer request (6), transmits UI frames (7) in FIR communications mode.

Meanwhile, since standing by for reception in FIR communications mode, the IrSimple-IrLAP layer in the receiving-end communications device 10 is able to receive the UI frames (7) in FIR communications mode. Upon receiving the UI frames (7) in FIR communications mode, the IrSimple-IrLAP layer sends the data transfer command (8) to the IrSimple-IrLMP layer. Likewise, the IrSimple-IrLMP layer sends the data transfer command (8) to the IrSMP layer. The IrSMP layer, upon determining from the frame numbers of the UI frames that there is no frame error, sends a data transfer command (8) to the OBEX layer.

It is possible to apply the configuration of the IrSMP layer processing section which detects frame errors using the aforementioned processing.

For example, when the transmitting-end communications device 100 repeatedly and continuously performs transmission using the one-way communications nature of the IrSS, the receiving-end communications device 10 could start reception somewhere in the middle of the communications sequence. Consequently, the device 10 may receive UI frames starting from a UI frame that is not the UI frame of the starting frame number (frame number 0).

When the UI frame that is received first has a non-zero frame number, a communications error occurs if the same frame error processing is carried out as conventional missing UI frame processing.

To address the problem, when the UI frame received first by the receiving-end communications device 10 has a non-zero frame number, the operation detailed below is preferably performed.

Referring to the sequence drawing in FIG. 10, an operation will be described which is performed when the IrSimple-IrLAP layer starts receiving UI frames somewhere in the middle of the sequence starting from a UI frame of frame number 1 (non-zero) and does not receive the UI frame of frame number 0.

The OBEX layer in the receiving-end communications device 10 sends a connect request (1) to the IrSMP layer. Likewise, the IrSMP layer sends the connect request (1) to the IrSimple-IrLMP layer. The IrSimple-IrLMP layer sends the connect request (1) to the IrSimple-IrLAP layer.

The IrSimple-IrLAP layer, upon reception the connect request (1), sends a connect command (2) to the IrSimple-IrLMP layer. Likewise, the IrSimple-IrLMP layer sends the connect command (2) to the IrSMP layer. The IrSMP layer sends the connect command (2) to the OBEX layer. As a result, the layers execute a connection process, successfully establishing a communications line.

If the IrSimple-IrLAP layer in the receiving-end communications device 10 does not receive an SNRM frame (3) and a UI frame (4) of frame number 0, but receives a subsequent UI frame (5) of frame number 1, the IrSimple-IrLAP layer in the receiving-end communications device 10 sends a data transfer command (6) to the IrSimple-IrLMP layer. Likewise, the IrSimple-IrLMP layer sends the data transfer command (6) to the IrSMP layer.

Upon detecting that the UI frame is frame number 1 (non-zero), the IrSMP layer sends a frame error (7) to the OBEX layer.

For the succeeding UI frames (8), the IrSimple-IrLAP layer also sends a data transfer command (9) to the IrSimple-IrLMP layer, and the IrSimple-IrLMP layer sends the data transfer command (9) to the IrSMP layer.

The IrSMP layer however does not send the data transfer command (9) to the OBEX layer.

Thereafter, upon receiving a DISC frame (10), the IrSimple-IrLAP layer sends a disconnect command (11) to the IrSimple-IrLMP layer. Likewise, the IrSimple-IrLMP layer sends the disconnect command (11) to the IrSMP layer. The IrSMP layer sends the disconnect command (11) to the OBEX layer. Accordingly, the layers in the receiving-end communications device 10 performs a disconnection process to discontinue the connection.

Immediately after that, the OBEX layer in the receiving-end communications device 10 sends a connect request (12) to the IrSMP layer. The connect request (12) reaches the IrSimple-IrLAP layer via the IrSimple-IrLMP layer, rendering the IrSimple-IrLAP layer stand by for reception again in FIR communications mode. Furthermore, the IrSimple-IrLAP layer sends a connect command (13) to the IrSimple-IrLMP layer.

The IrSimple-IrLMP layer sends the connect command (13) to the IrSMP layer. The IrSMP layer sends the connect command (13) to the OBEX layer. As a result, the layers execute a connection process, successfully establishing a communications line again.

Next, the transmitting-end communications device 100 transmits an SNRM frame (14) in SIR communications mode. Since the receiving-end communications device 10 is standing by for reception in FIR communications mode, the device 10 cannot receive the SNRM frame (14). Subsequently, the transmitting-end communications device 100 transmits a UI frame (15) of frame number 0.

The IrSimple-IrLAP layer in the transmitting-end communications device 10, upon receiving the UI frame (15) of frame number 0, sends a data transfer command (16) to the IrSimple-IrLMP layer. Likewise, the IrSimple-IrLMP layer sends the data transfer command (16) to the IrSMP layer. Upon detecting that the UI frame is frame number 0, the IrSMP layer sends the data transfer command (16) to the OBEX layer.

As described in the foregoing, in the present embodiment, even if a UI frame is received without receiving the SNRM frame transmitted by the transmitting-end communications device 100, the IrSimple-IrLAP layer in the receiving-end communications device 10 generates the connect command for output to the IrSimple-IrLMP layer.

Alternatively, immediately after the IrSimple-IrLMP layer in the receiving-end communications device 10 sends the connect request to the IrSimple-IrLAP layer in the receiving-end communications device 10, that is, without waiting for the reception of an SNRM frame or a UI frame transmitted from the transmitting-end communications device 100, the IrSimple-IrLAP layer generates and sends the connect command to the IrSimple-IrLMP layer.

According to the above arrangement, the receiving-end communications device 10 is capable of establishing a connection in a communications environment in which the connect frame cannot be normally received due to infrared noise and other factors. Therefore, the arrangement increases the probability of successfully receiving the subsequent data frames.

In addition, in one-way infrared communications termed IrSS, the transmitting-end communications device 100 terminates a one-way communications sequence regardless of whether the receiving-end communications device 10 has successfully received data or not. In this context, if the transmitting-end communications device 100 repeatedly implements the one-way communications sequence, and the receiving-end communications device 10 starts receiving somewhere in the middle of the sequence, the receiving-end communications device 10 which has started reception is highly likely to receive a UI frame of a frame number which is not the starting frame number (frame number 0) before any other UI frame.

The conventional communications device does not execute the UI frame reception process and starts a data reception process after receiving the SNRM frame in a next one-way communications sequence. The conventional communications device therefore does not develop communications error.

The receiving-end communications device 10 of the present invention, on the other hand, performs a reception process for succeeding UI frames without having to receive the SNRM frame, by generating the connect command by itself. Communications error therefore occurs in the data frame flow management by the IrSMP layer.

Accordingly, if the IrSimple-IrLAP layer in the receiving-end communications device 10 starts reception from a UI frame which does not have the starting frame number (frame number 0), the IrSMP layer (transport layer) sends a frame error to the OBEX layer (session layer), without having to sending a data transfer command for succeeding UI frames to the OBEX layer.

Alternatively, if the IrSimple-IrLAP layer starts reception from a UI frame which does not have the starting frame number (frame number 0), the IrSMP layer may send a connect request to the IrSimple-IrLMP layer, the IrSimple-IrLMP layer may send the connect request to the IrSimple-IrLAP layer, so that the IrSimple-IrLAP layer can return to a connect frame reception standby state.

The arrangement is capable of preventing occurrence of communications error when the receiving-end communications device 10 starts receiving data frames in the middle of the sequence in communications with the transmitting-end communications device 100 in which the data frames are transmitted repeatedly according to the one-way communications sequence.

Supplementary Description

The receiving-end communications device 10 includes time measurement means measuring the time elapsed after the establishing of a connection to determine whether or not the elapsed time is longer than or equal to a predetermined time or shorter or equal to a predetermined time. When a predetermined time has elapsed after the layers establish a connection using the connect command generated by the IrSimple-IrLAP layer, the OBEX layer sends a disconnect request to the IrSimple-IrLAP layer via the lower layer.

The arrangement prevents a situation in which the connection of the receiving-end communications device 10 is continuously maintained in spite of absence of the transmitting-end communications device 100 in the surroundings of the communications device.

Alternatively, if an SNRM frame transmitted by the transmitting-end communications device 100 is received after the predetermined time has elapsed from the establishing of the connection using the SNRM frame generated by the IrSimple-IrLAP layer, the IrSimple-IrLAP layer in the receiving-end communication device 10 may send a new connect command to the IrSimple-IrLMP layer. The arrangement enables the receiving-end communication device 10 to set transmission conditions for UI frames using the parameters contained in the SNRM frame transmitted by the transmitting-end communications device 100. The UI frames are thus more reliably received than when the connection is established using an SNRM frame generated by the IrSimple-IrLAP layer.

The receiving-end communication device 10 may use the connect frame generated inside the data link layer may be used to establish a connection also when the communications device has received the connect frame transmitted from the transmitting-end communications device 100.

The IrSimple-IrLAP layer in the receiving-end communication device 10 may be characterized in that the layer generates a connect command based on default values which are predetermined in the IrDA and like communications standards as connection parameters which represent transmission conditions for succeeding UI frames. Alternatively, the connect command may contain no connection parameters which represent transmission conditions for succeeding UI frames and be sent to each upper layer to transmit a connect command.

The receiving-end communication device 10 preferably further includes an image display section producing an image display from the image data transmitted by the data frame transmission. Accordingly, when the receiving-end communication device 10 receives the image data, the device can display an image on the image display section from the image data.

The present invention is not limited to the description of the embodiments above, but may be altered by a skilled person within the scope of the claims. An embodiment based on a proper combination of technical means disclosed in different embodiments is encompassed in the technical scope of the present invention.

Finally, the blocks of the receiving-end communication device 10, especially, those of the incoming frame processing section 40, may be implemented by hardware or software executed by a CPU as follows:

The receiving-end communication device 10 includes a CPU (central processing unit) and memory devices (storage media). The CPU executes instructions contained in control programs, realizing various functions. The memory devices may be a ROM (read-only memory) which contains programs, a RAM (random access memory) to which the programs are loaded, or a memory containing the programs and various data. The objectives of the present invention can be achieved also by mounting to the receiving-end communication device 10 a computer-readable storage medium containing control program code (executable programs, intermediate code programs, or source programs) for the receiving-end communication device 10, which is software realizing the aforementioned functions, in order for a computer (or CPU, MPU) to retrieve and execute the program code contained in the storage medium.

The storage medium may be, for example, a tape, such as a magnetic tape or a cassette tape; a magnetic disk, such as a floppy® disk or a hard disk, or an optical disc, such as CD-ROM/MO/MD/DVD/CD-R; a card, such as an IC card (memory card) or an optical card; or a semiconductor memory, such as a mask ROM/EPROM/EEPROM/flash ROM.

The receiving-end communication device 10 may be arranged to be connectable to a communications network so that the program code may be delivered over the communications network. The communications network is not limited in any particular manner, and may be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited in any particular manner, and may be, for example, a wired line, such as IEEE 1394, USB, an electric power line, a cable TV line, a telephone line, or an ADSL; or wireless, such as infrared (IrDA, remote control), Bluetooth®, 802.11 wireless, HDR, a mobile telephone network, a satellite line, or a terrestrial digital network. The present invention encompasses a carrier wave, or data signal transmission, by which the program code is embodied electronically.

Function and Effects of The Invention

As detailed above, the communications device according to the present invention includes: an incoming frame processing section for receiving a connect frame and data frames in different frame formats from another communications device for output to an upper layer, the connect frame containing a setting for a connection for data communications, the data frames containing data; and a connect command generation section for, at least either if the incoming frame processing section has received a data frame before receiving the connect frame or if the incoming frame processing section has received a connect request from the upper layer, generating a connect command for output to the upper layer.

The communications method according to the present invention is implemented by a communications device including an incoming frame processing section for receiving a connect frame and data frames in different frame formats from another communications device, the connect frame containing a setting for a connection for data communications, the data frames containing data, and also that the method includes the step of, at least either if the incoming frame processing section has received a data frame before receiving the connect frame or if the incoming frame processing section has received a connect request from the upper layer, generating a connect command for output to the upper layer.

According to the arrangement, when the connect frame and the data frames are transmitted in different communications modes, specifically, at two or more different communications speeds, modulation schemes, or various other communications conditions, the data frames can be received in a second communications mode even if the connect frame cannot be normally received in a first communications mode. Therefore, the arrangement increases the probability of successfully receiving subsequent data frames.

The communications device is preferably such that the connect command generation section generates the connect command by using a predetermined value which would presumably be contained in the connect frame if the connect frame was received from the other communications device.

According to the arrangement, the connect command is generated by using a predetermined communications condition setup value stored, for example, in a memory section. Normal communications can be continued by relying on arbitrary communications conditions prepared in advance even if the connect frame containing setting information required for a connection cannot be received.

The connect command generation section may generate the connect command based on a default value which is predetermined in the IrDA and like communications standards as transmission conditions for subsequent data frames.

The communications device may be such that the connect command generation section outputs no connection parameters representing transmission conditions for the data frames to the upper layer.

According to the arrangement, the connect command generated contains no connection parameters. Process workload in the connect command generation is reduced.

The communications device preferably further includes a frame monitoring section for monitoring the data frames received by the incoming frame processing section, wherein if the frame monitoring section has detected that a data frame received by the incoming frame processing section does not have a starting frame number, the frame monitoring section notifies the upper layer of an error so that the incoming frame processing section suspends sending subsequently received data frames to the upper layer.

Alternatively, the communications device may further include a frame monitoring section for monitoring the data frames received by the incoming frame processing section, wherein if the frame monitoring section has detected that a data frame received by the incoming frame processing section does not have a starting frame number, the connect command generation section renders the incoming frame processing section stand by for reception of the connect frame.

According to the arrangement, the frame monitoring section monitors incoming data frames. If data frame reception cannot be normally continued in accordance with the connect command generated by the connect command generation section, the transfer of the data that cannot be received under current conditions to the upper layer is discontinued.

Specifically, the arrangement prevents occurrence of communications error when the communications device starts receiving data frames in the middle of the sequence in communications with the transmitting-end communications device in which the data frames are transmitted repeatedly according to the one-way communications sequence.

The communications device preferably further includes an elapsed time measuring section for measuring time elapsed after the connect command generation section sends the connect command to the upper layer or time elapsed after establishing of a connection based on the connect command.

The arrangement enables execution of a suitable process by determining the success/failure of the communications connection based on the time elapsed after the connect command is sent or the time elapsed after establishing of a connection based on the connect command.

The communications device preferably further includes a disconnect command generation section for, when the time measured by the elapsed time measuring section has reached a predetermined time, outputting a command to discontinue the connection to the upper layer.

The arrangement determines whether the generation of the connect command has been successful or not based on the time elapsed after the connect command is sent or the time elapsed after establishing of a connection based on the connect command.

The arrangement selects more suitable data frame transmission conditions to continue communications. For example, the arrangement prevents a situation in which a data receiving connection is continuously maintained in spite of absence of a communications terminal which is the destination in the communications in the surroundings.

The communications device is preferably such that if the incoming frame processing section receives the connect frame from the other communications device after the connect command generation section generates the connect command, the incoming frame processing section disregards the connect frame.

According to the arrangement, process workload can be reduced by the incoming frame processing section performing no new connection process.

Specifically, for example, when communications have been carried out for a sufficient period of time by the generated frame formats specified in the connect request, the connect command generation section may the disregard the connect frame and continue the communications using the generated frame formats even if an connect frame specifying a frame format is received from the transmitting-end communications device.

The communications device is preferably such that if the incoming frame processing section receives the connect frame before the time measured by the elapsed time measuring section predetermined does not reach the predetermined time, the connect command generation section generates a connect command by using values contained in the connect frame to output the connect command to the upper layer.

According to the arrangement, transmission conditions for the data frame can be specified using the frame format information contained in the connect frame transmitted by the transmitting-end communications device. The communications are thus more reliably performed than when the connection is established using the connect command generated by the connect command generation section in the receiving-end communications device.

The communications device is preferably such that the incoming frame processing section carries out communications over a communications path using infrared.

According to the arrangement, a communications connection can be established in such a communications environment that a connect frame cannot be normally received due to infrared noise and other factors in data communications.

The communications method may be implemented on a computer. When that is the case, the scope of the present invention encompasses data reception programs which are run on the computer to realize the communications method by the computer executing the steps and computer-readable storage mediums containing the programs.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

Industrial Applicability

The communications device of the present invention is capable of receiving a connect frame and data frames which are transmitted in different frame formats from another device involved in data frame communications by using a second communications mode if the device cannot normally receive the connect frame in a first communications mode. The device is thus highly likely to succeed in the reception of subsequent data frames. Therefore, the invention is suitably applicable to communications devices which receive data using different communications modes for connect frame transmission and data frame transmission, especially those communications devices which receive large data, such as image data, by IrSimpleShot or a like high speed infrared communications protocol.

What is claimed is:

1. A communications device having layers including at least an upper layer and a lower layer which layers are connected to each other at communication from a transmitting-end device transmitting a data frame and transmitting a connect frame for the data frame before transmitting the data frame, transmission of each of the data frame and the connect frame being made in a corresponding communications mode indicating a communications condition, the communications condition for the data frame and the communications condition for the connect frame are different from each other, the data frame containing user data, the connect frame containing a setting for connection of the layers for data communications of the data frame from the transmitting-end device, the setting being an instruction of establishment of connection of the layers, containing connection parameters presenting transmission conditions for the data frame, and not containing user data, the communication device comprising:

an incoming frame processing section for standing by for reception in a communications mode for the data frame before start of communication with the transmitting-end device and for receiving the data frame from the transmitting-end device and for output to the upper layer; and a connect command generation section for generating a connect command for output to the upper layer so as to establish connection of the layers if the incoming frame processing section has received the data frame in a state where the communications device has not received the connect frame and has not started communication with the transmitting-end device.

2. The communications device according to claim 1, wherein the connect command generation section generates the connect command by using a predetermined value which would presumably be contained in the connect frame if the connect frame was received from the other communications device.

3. The communications device according to claim 1, wherein the connect command generation section outputs no connection parameters representing transmission conditions for the data frames to the upper layer.

4. The communications device according to claim 1, further comprising a frame monitoring section for monitoring the data frames received by the incoming frame processing section, wherein if the frame monitoring section has detected that a data frame received by the incoming frame processing section does not have a starting frame number, the frame monitoring section notifies the upper layer of an error so that the incoming frame processing section suspends sending subsequently received data frames to the upper layer.

5. The communications device according to claim 1, further comprising a frame monitoring section for monitoring the data frames received by the incoming frame processing section, wherein if the frame monitoring section has detected that a data frame received by the incoming frame processing section does not have a starting frame number, the connect command generation section renders the incoming frame processing section stand by for reception of the connect frame.

6. The communications device according to claim 1, further comprising an elapsed time measuring section for measuring time elapsed after the connect command generation section sends the connect command to the upper layer or time elapsed after establishing of a connection based on the connect command.

7. The communications device according to claim 6, further comprising a disconnect command generation section for, when the time measured by the elapsed time measuring section has reached a predetermined time, outputting a command to discontinue the connection to the upper layer.

8. The communications device according to claim 1, wherein if the incoming frame processing section receives the connect frame from the other communications device after the connect command generation section generates the connect command, the incoming frame processing section disregards the connect frame.

9. The communications device according to claim 1, wherein if the incoming frame processing section receives the connect frame from the other communications device after the connect command generation section generates the connect command, the connect command generation section generates another connect command by using values contained in the connect frame to output the other connect command to the upper layer.

10. The communications device according to claim 1, wherein the incoming frame processing section carries out communications over a communications path using infrared.

11. A communications method implemented by a communications device having layers including at least an upper layer and a lower layer which layers are connected to each other at communication from a transmitting-end device transmitting a data frame and transmitting a connect frame for the data frame before transmitting the data frame, transmission of each of the data frame and the connect frame being made in a corresponding communications mode indicating a communications condition, the communications condition for the data frame and the communications condition for the connect frame are different from each other,
the data frame containing user data,
the connect frame containing a setting for connection of the layers for data communications of the data frame from the transmitting-end device, the setting being an instruction of establishment of connection of the layers, containing connection parameters presenting transmission conditions for the data frame, and not containing user data,
said method comprising the steps of:
standing by for reception in a communications mode for the data frame before start of communication with the transmitting-end device;
receiving the data frame from the transmitting-end device and for output to the upper layer; and
generating a connect command for output to the upper layer so as to establish connection of the layers if the data frame is received in a state where the communications device has not received the connect frame and has not started communication with the transmitting-end device.

12. A non-transitory computer-readable storage medium containing a communications computer program for operation of the communications device according to claim 1, said program causing a computer to function as said sections.

13. The communication device according to claim 1, wherein the incoming frame processing section receives the data frame by wireless communications.

14. The communication method according to claim 11, wherein the data frame is received by wireless communications.

15. The communication device according to claim 1, wherein the incoming frame processing section receives the data frame as light.

16. The communication method according to claim 11, wherein the data frame is received as light.

17. The communication device according to claim 1, wherein the communications device does not connect to the transmitting-end by wired communications.

18. The communication method according to claim 11, wherein the communications device does not connect to the transmitting-end by wired communications.

19. The communications device according to claim 1, wherein the connect command is used for establishing a communications connection.

20. The communications device according to claim 1, further comprising:
a disconnect command generation section for generating a disconnect command, wherein the disconnect command is used for disconnecting said established communications connection.

21. The communication method according to claim 11, wherein the connect command is used for establishing a communications connection.

22. The communication method according to claim 11, further comprising:
generating a disconnect command, wherein the disconnect command is used for disconnecting said established communications connection.

23. The communications device according to claim 1, wherein the communications mode for the data frame and the communications mode for the connect frame is different from each other.

24. The communications device according to claim 1, wherein the communications mode for the data frame is of higher speed than the communications mode for the connect frame.

25. The communications method according to claim 11, wherein the communications mode for the data frame and the communications mode for the connect frame is different from each other.

26. The communications method according to claim 11, wherein the communications mode for the data frame is of higher speed than the communications mode for the connect frame.

27. A communications device having layers including at least an upper layer and a lower layer which layers are connected to each other at communication from a transmitting-end device transmitting a data frame and transmitting a connect frame for the data frame before transmitting the data frame, transmission of each of the data frame and the connect frame being made in a corresponding communications mode indicating a communications condition, the communications condition for the data frame and the communications condition for the connect frame are different from each other,
the data frame containing user data,
the connect frame containing a setting for connection of the layers for data communications of the data frame from the transmitting-end device, the setting being an instruction of establishment of connection of the layers, containing connection parameters presenting transmission conditions for the data frame, and not containing user data,
the communications device comprising:
an incoming frame processing section for receiving the data frame from the transmitting-end device and for output to the upper layer; and
a connect command generation section for generating a connect command for output to the upper layer of the communications device so as to establish connection of the layers and standing by for reception in a communications mode for the data frame if the incoming frame processing section has received a connect request from the upper layer of the communications device in a state where the communications device has not received the connect frame and has not started communication with the transmitting-end device.

28. A communications method implemented by a communications device having layers including at least an upper layer and a lower layer which layers are connected to each other at communication from a transmitting-end device transmitting a data frame and transmitting a connect frame for the data frame before transmitting the data frame, transmission of each of the data frame and the connect frame being made in a corresponding communications mode indicating a communications condition, the communications condition for the data frame and the communications condition for the connect frame are different from each other, the data frame containing user data, the connect frame containing a setting for connection of the layers for data communications of the data frame from the transmitting-end device, the setting being an instruction of establishment of connection of the layers, containing connection parameters presenting transmission conditions for the data frame, and not containing user data, said method comprising the steps of:

receiving the data frame from the transmitting-end device and for output to the upper layer; and generating a connect command for output to the upper layer of the communications device so as to establish connection of the layers and standing by for reception in a communications mode for the data frame if a connect request from the upper layer of the communications device is received in a state where the communications device has not received the connect frame and has not started communication with the transmitting-end device.

29. The communications device according to claim 27, wherein the connect command generation section generates the connect command by using a predetermined value which would presumably be contained in the connect frame if the connect frame was received from the other communications device.

30. The communications device according to claim 27, wherein the connect command generation section outputs no connection parameters representing transmission conditions for the data frames to the upper layer.

31. The communications device according to claim 27, further comprising a frame monitoring section for monitoring the data frames received by the incoming frame processing section, wherein if the frame monitoring section has detected that a data frame received by the incoming frame processing section does not have a starting frame number, the frame monitoring section notifies the upper layer of an error so that the incoming frame processing section suspends sending subsequently received data frames to the upper layer.

32. The communications device according to claim 27, further comprising a frame monitoring section for monitoring the data frames received by the incoming frame processing section, wherein if the frame monitoring section has detected that a data frame received by the incoming frame processing section does not have a starting frame number, the connect command generation section renders the incoming frame processing section stand by for reception of the connect frame.

33. The communications device according to claim 27, further comprising an elapsed time measuring section for measuring time elapsed after the connect command generation section sends the connect command to the upper layer or time elapsed after establishing of a connection based on the connect command.

34. The communications device according to claim 33, further comprising a disconnect command generation section for, when the time measured by the elapsed time measuring section has reached a predetermined time, outputting a command to discontinue the connection to the upper layer.

35. The communications device according to claim 27, wherein if the incoming frame processing section receives the connect frame from the other communications device after the connect command generation section generates the connect command, the incoming frame processing section disregards the connect frame.

36. The communications device according to claim 27, wherein if the incoming frame processing section receives the connect frame from the other communications device after the connect command generation section generates the connect command, the connect command generation section generates another connect command by using values contained in the connect frame to output the other connect command to the upper layer.

37. The communications device according to claim 27, wherein the incoming frame processing section carries out communications over a communications path using infrared.

38. The communication device according to claim 27, wherein the incoming frame processing section receives the data frame by wireless communications.

39. The communication method according to claim 28, wherein the data frame is received by wireless communications.

40. The communication device according to claim 27, wherein the incoming frame processing section receives the data frame as light.

41. The communication method according to claim 28, wherein the data frame is received as light.

42. The communication device according to claim 27, wherein the communications device does not connect to the transmitting-end by wired communications.

43. The communication method according to claim 28, wherein the communications device does not connect to the transmitting-end by wired communications.

44. The communications device according to claim 27, wherein the connect command is used for establishing a communications connection.

45. The communications device according to claim 27, further comprising:

a disconnect command generation section for generating a disconnect command, wherein the disconnect command is used for disconnecting said established communications connection.

46. The communication method according to claim 28, wherein the connect command is used for establishing a communications connection.

47. The communication method according to claim 28, further comprising:

generating a disconnect command, wherein the disconnect command is used for disconnecting said established communications connection.

48. The communications device according to claim 27, wherein the communications mode for the data frame and the communications mode for the connect frame is different from each other.

49. The communications device according to claim 27, wherein the communications mode for the data frame is of higher speed than the communications mode for the connect frame.

50. The communications method according to claim 28, wherein the communications mode for the data frame and the communications mode for the connect frame is different from each other.

51. The communications method according to claim 28, wherein the communications mode for the data frame is of higher speed than the communications mode for the connect frame.

52. A non-transitory computer-readable storage medium containing a communications computer program for operation of the communications device according to claim 27, said program causing a computer to function as said sections.

* * * * *